US012190846B2

(12) United States Patent
Kim et al.

(10) Patent No.: US 12,190,846 B2
(45) Date of Patent: Jan. 7, 2025

(54) DATA PROCESSING DEVICE, DATA DRIVING DEVICE, AND DISPLAY PANEL DRIVING DEVICE FOR DRIVING DISPLAY PANEL

(71) Applicant: LX Semicon Co., Ltd., Daejeon (KR)

(72) Inventors: Do Seok Kim, Daejeon (KR); Yong Hwan Mun, Daejeon (KR); Myung Yu Kim, Daejeon (KR); Hyun Pyo Cho, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/232,788

(22) Filed: Aug. 10, 2023

(65) Prior Publication Data

US 2024/0013749 A1 Jan. 11, 2024

Related U.S. Application Data

(63) Continuation of application No. 17/751,380, filed on May 23, 2022, now Pat. No. 11,763,775.

(30) Foreign Application Priority Data

May 31, 2021 (KR) ........................ 10-2021-0069767
Apr. 5, 2022 (KR) ........................ 10-2022-0042268

(51) Int. Cl.
*G06F 3/038* (2013.01)
*G09G 5/00* (2006.01)

(52) U.S. Cl.
CPC ......... *G09G 5/008* (2013.01); *G09G 2320/08* (2013.01); *G09G 2370/04* (2013.01)

(58) Field of Classification Search
CPC . G09G 5/008; G09G 2320/08; G09G 2370/07
USPC .......................................................... 345/204
See application file for complete search history.

(56) References Cited

U.S. PATENT DOCUMENTS

| | | | |
|---|---|---|---|
| 9,508,321 | B2 | 11/2016 | Oh et al. |
| 10,354,587 | B2 | 7/2019 | Kim et al. |
| 2015/0154942 | A1 | 6/2015 | Hsu et al. |
| 2015/0243254 | A1 | 8/2015 | Choi |
| 2018/0114479 | A1 | 4/2018 | Han et al. |
| 2020/0090616 | A1 | 3/2020 | Duan et al. |

FOREIGN PATENT DOCUMENTS

| | | |
|---|---|---|
| KR | 10-1121958 B1 | 3/2012 |

*Primary Examiner* — Jonathan M Blancha
(74) *Attorney, Agent, or Firm* — POLSINELLI PC

(57) ABSTRACT

The present disclosure relates to a technology for driving a display panel, wherein setting data for setting an environment of a high-speed communication is transmitted through a low-speed communication before performing a high-speed communication for image data, thereby reducing errors in the high-speed communication and increasing the communication speed.

20 Claims, 14 Drawing Sheets

DATA PROCESSING DEVICE, DATA DRIVING DEVICE, AND DISPLAY PANEL DRIVING DEVICE FOR DRIVING DISPLAY PANEL

CROSS REFERENCE TO RELATED APPLICATIONS

This application is a continuation of U.S. patent application Ser. No. 17/751,380, filed on May 23, 2022, which claims priority from Republic of Korea Patent Applications Nos. 10-2021-0069767 filed on May 31, 2021 and 10-2022-0042268 filed on Apr. 5, 2022, which are hereby incorporated by reference in their entirety.

BACKGROUND

1. Field of Technology

The present disclosure relates to a technology for driving a display device.

2. Description of the Prior Art

A display panel is composed of a plurality of pixels arranged in a matrix form. Each pixel may have colors such as R (red), G (green), and B (blue), and displays an image on the display panel while emitting light in gray scale according to image data.

The image data is transmitted from a data processing device referred to as a timing controller to a data driving device referred to as a source driver. The image data is transmitted as a digital value, and the data driving device converts the image data into an analog voltage to drive each pixel.

Since the image data individually or independently indicates a gradation value of each pixel, the amount of image data increases as the number of pixels disposed on the display panel increases. Further, as the frame rate increases, the amount of image data to be transmitted per unit time increases.

With the recent high resolution of the display panel, both the number of pixels arranged on the display panel and the frame rate are increasing, and data communication in the display device is speeding up to process the increased amount of image data.

SUMMARY OF THE INVENTION

In view of the above, the present disclosure provides a technology for improving the performance of high-speed data communication.

In accordance with one embodiment, there is provided a data driving device comprising: a low-speed communication circuit that receives setting data at a first data rate through a first communication line; a high-speed communication circuit that operates according to setting values included in the setting data and receives image data at a second data rate higher than the first data rate through the first communication line; and a data driving circuit that drives pixels of a display panel according to the image data.

In accordance with another embodiment, there is provided a data processing device comprising: an image data processing circuit that processes image data for driving pixels of a display panel; a low-speed communication circuit that transmits setting data for communication at a high-speed communication rate at a low communication rate lower than the high-speed communication rate through a first communication line; and a high-speed communication circuit that transmits the image data at the high-speed communication rate through the first communication line after the setting data is transmitted.

In accordance with still another embodiment, there is provided a display panel driving device comprising: a first communication line for LVDS (Low Voltage Differential Signaling) communication; a data processing device for transmitting setting data to the first communication line at a low-speed communication rate; and data driving devices for driving pixels of a display panel that performs high-speed communication at a high-speed communication rate higher than the low-speed communication rate through the first communication line, sets high-speed communication environment according to setting values included in the setting data, receives image data through the high-speed communication, and drives the pixels of the display panel.

The display panel driving device may further include a second communication line through which a state signal is transmitted, and each data driving device transmits the state signal to the data processing device through the second communication line when an abnormality is detected in the high-speed communication.

The first communication line may be one-to-one connected between the data processing device and each data driving device, and the second communication line may be connected between the data processing device and the data driving devices in a cascade form.

The setting data may be transmitted from the data processing device to the data driving device in a setting data section after a driving voltage is supplied to the data processing device and the data driving devices.

In a display section after the setting data is transmitted, the image data may be transmitted from the data processing device to the data driving devices.

As described above, according to the embodiments of the present disclosure, it is possible to increase the accuracy and efficiency of data validation by checking the data validity in data communication in different ways depending on the type and operation mode of the transmitted/received data. Further, according to the embodiments of the present disclosure, it is possible to reduce the amount of power consumed in data communication and to minimize the possibility of a malfunction of erroneously entering the power saving mode due to a communication error. In addition, according to the embodiments of the present disclosure, even if an error occurs in one of the plurality of data driving devices, all data driving devices can be initialized at the same time, and operation modes of the data driving devices and the data processing device can be easily synchronized. Moreover, according to the embodiments of the present disclosure, it is easy to manage the operation modes of the data driving devices and the data processing device, and the recovery time in the event of an error can be minimized.

DETAILED DESCRIPTION OF THE EXEMPLARY EMBODIMENTS

Figure 1:
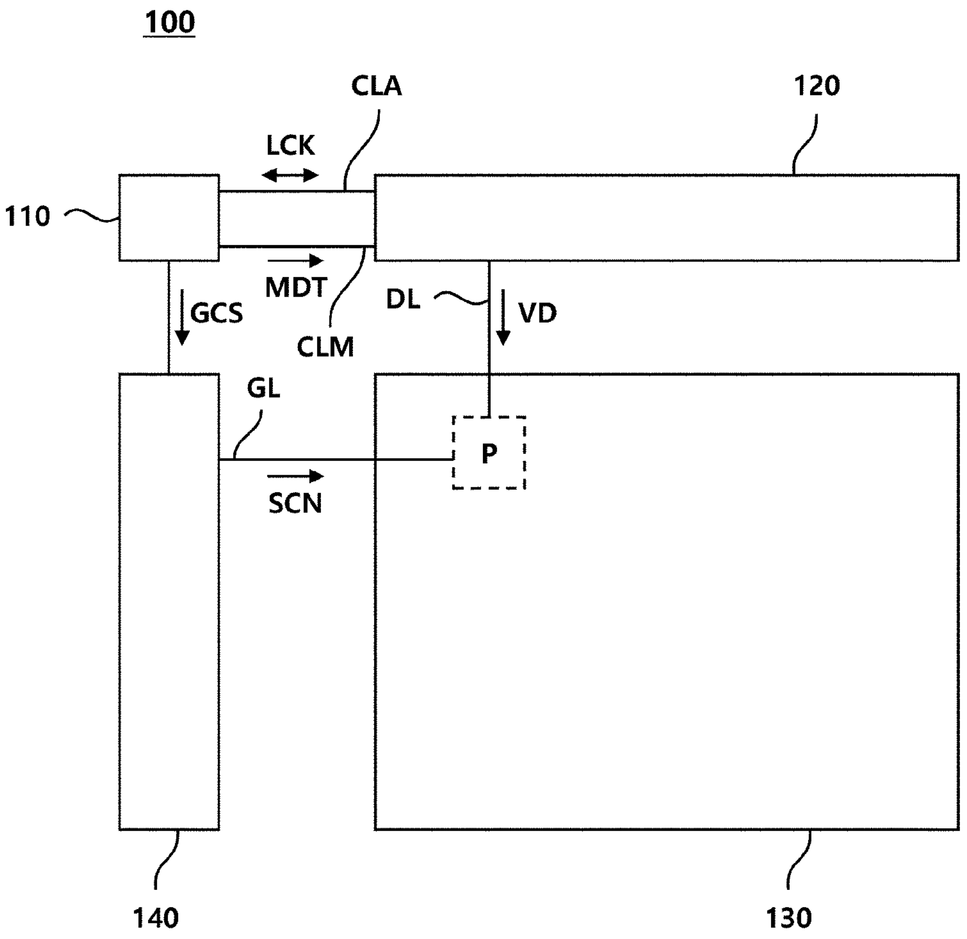
FIG. 1 is a configuration diagram of a display device according to one embodiment.

FIG. 1 is a configuration diagram of a display device according to one embodiment.

Referring to FIG. 1, the display apparatus 100 may include a data processing device 110, a data driving device 120, a display panel 130, a gate driving apparatus 140, and the like.

The data processing device 110 may receive image data from another apparatus. The another device is a device that generates image data and is also referred to as a host.

The data processing device 110 may process image data received from another device (e.g., a host) to be suitable for the data driving device 120, and transmit the processed image data to the data driving device 120. The data processing device 110 may perform digital gamma correction processing on a gradation value of each pixel included in the image data, or may perform compensation processing in accordance with the characteristics of each pixel.

The data driving device 120 may receive image data from the data processing device 110, generate a data voltage VD according to a gradation value of a pixel included in the image data, and supply the data voltage VD to the pixel P.

A plurality of pixels P may be disposed on the display panel 130. In addition, each pixel P may be connected to the data driving device 120 through a data line DL, and may be connected to the gate driving device 140 through a gate line GL.

A scan transistor may be disposed in each pixel P, a gate terminal of the scan transistor may be connected to the gate line GL, and a source terminal may be connected to the data line DL. When the gate driving device 140 supplies a scan signal SCN to the gate line GL, the scan transistor is turned on and the data line DL is connected to the pixel P. Then, after the data line DL is connected to the pixel P, the data voltage VD supplied by the data driving device 120 is transmitted to the pixel P.

In order to match the timing of the gate driving device 140 and the data driving device 120, the data processing device 110 may transmit a timing control signal to the gate driving device 140 and the data driving device 120.

The data processing device 110 may transmit a gate control signal GCS to the gate driving device 140. The gate control signal GCS may include the above-described timing control signal. The gate driving device 140 may generate the scan signal SCN according to the gate control signal GCS and supply the scan signal SCN to the pixel P through the gate line GL.

At least two types of communication lines CLM and CLA may be disposed between the data processing device 110 and the data driving device 120. The data processing device 110 may transmit a first communication signal MDT through a first communication line CLM and transmit or receive a second communication signal LCK through a second communication line CLA. Hereinafter, for convenience of description, the first communication line CLM is referred to as a main communication line, and the second communication line CLA is referred to as an auxiliary communication line. In addition, the first communication signal MDT is referred to as a main communication signal, and the second communication signal LCK is referred to as an auxiliary communication signal.

The data processing device 110 may transmit image data and timing control signals to the data driving device 120 through the main communication signal MDT, and the data driving device 120 may transmit state information to the data processing device 110 through the auxiliary communication signal LCK.

Figure 2:
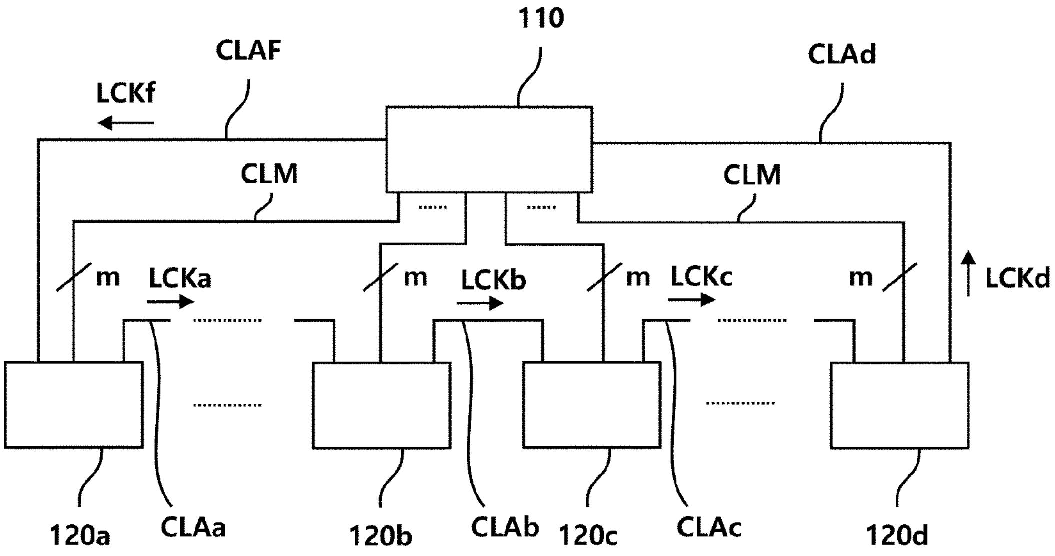
FIG. 2 is a configuration diagram illustrating main communication and auxiliary communication between a data processing device and a data driving device according to one embodiment.

FIG. 2 is a configuration diagram illustrating main communication and auxiliary communication between the data processing device and the data driving device according to one embodiment.

Referring to FIG. 2, the data driving device may include a plurality of data driving integrated circuits 120*a*, 120*b*, 120*c*, and 120*d*.

In addition, the data processing device 110 may be communicatively connected to the data driving integrated circuits 120*a*, 120*b*, 120*c*, and 120*d* through the main communication lines CLM. The data processing device 110 may be connected to each of the data driving integrated circuits 120*a*, 120*b*, 120*c*, and 120*d* for one-to-one communication. For example, the data processing device 110 may be connected to the first data driving integrated circuit 120*a* for one-to-one communication, and may be connected to the second data driving integrated circuit 120*b* in one-to-one communication.

Each of the main communication lines CLM may include m (m is a natural number) number of lines that are electrically insulated. In addition, the m number of lines may be paired in a plurality of pairs and each pair can perform low voltage differential signaling (LVDS) communication.

Such a communication connection structure and main communication signals (see, MDT of FIG. 1) transmitted/received between the data processing device 110 and the data driving integrated circuits 120*a*, 120*b*, 120*c*, and 120*d* may be collectively referred to as main communication.

The data processing device 110 and the data driving integrated circuits 120*a*, 120*b*, 120*c*, and 120*d* may transmit/receive information through auxiliary communication in addition to the main communication.

The auxiliary communication between the data driving integrated circuits 120*a*, 120*b*, 120*c*, and 120*d* may be connected in the form of a cascade. For example, a first data driving integrated circuit 120*a* disposed at the beginning of the cascade may transmit a first auxiliary communication signal LCKa to a second data driving integrated circuit 120*b* through a first auxiliary communication line CLAa. In addition, the second data driving integrated circuit 120*b* may generate a second auxiliary communication signal LCKb by combining an internally generated state signal and the first auxiliary communication signal LCKa and transmit the second auxiliary communication signal LCKb to a third data driving integrated circuit 120*c* through a second auxiliary communication line CLAb. In addition, the third data driving integrated circuit 120*c* may generate a third auxiliary communication signal LCKc by combining an internally generated state signal and the second auxiliary communication signal LCKb and transmit the third auxiliary communication signal LCKc to a fourth data driving integrated circuit 120*d* through a third auxiliary communication line CLAc.

The fourth data driving integrated circuit 120*d* disposed at the end of the cascade may generate a fourth auxiliary communication signal LCKd by combining an internally generated state signal and the third auxiliary communication signal LCKc and transmit the fourth auxiliary communication signal LCKd to the data processing device 110 through a fourth auxiliary communication line CLAd. Here, the fourth data driving integrated circuit 120*d* disposed at the end of the cascade transmits an auxiliary communication signal to the data processing device 110 through the auxiliary communication.

The data processing device 110 may check the states of the data driving integrated circuits 120*a*, 120*b*, 120*c*, and 120*d* based on the auxiliary communication signal received from the fourth data driving integrated circuit 120*d* disposed at the end of the cascade. In addition, the data processing device 110 may transmit an auxiliary communication feedback signal LCKf for the auxiliary communication signal to the first data driving integrated circuit 120*a* disposed at the beginning of the cascade through an auxiliary communication feedback line CLAF. For example, the data processing device 110 may generate the auxiliary communication feedback signal LCKf in the same form as the auxiliary communication signal received from the fourth data driving integrated circuit 120*d* and transmit the same to the first data driving integrated circuit 120*a*.

Figure 3:
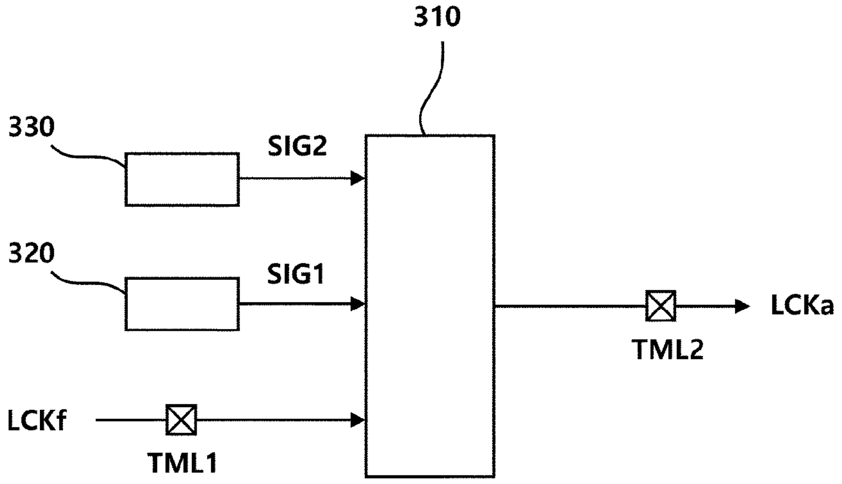
FIG. 3 is a configuration diagram of a portion of a first data driving integrated circuit of FIG. 2 that processes an auxiliary communication signal.

FIG. 3 is a configuration diagram of a portion of the first data driving integrated circuit of FIG. 2 that processes an auxiliary communication signal.

Referring to FIG. 3, the first data driving integrated circuit may include an auxiliary communication input terminal TML1 and an auxiliary communication output terminal TML2, and may include a signal combination circuit 310 and a state signal generation circuit 320.

The signal combination circuit 310 may generate an output signal by combining an input signal received from the auxiliary communication input terminal TML1 and a state signal SIG1 generated by the state signal generation circuit 320 and output the output signal to the auxiliary communication output terminal TML2. The input signal may be the auxiliary communication feedback signal LCKf described above, and the output signal may be the first auxiliary communication signal LCKa described above.

The state signal generation circuit 320 may check the communication state of the main communication line and generate the state signal SIG1 according to the communication state of the main communication line. For example, when the communication state of the main communication line is normal, the state signal generation circuit 320 may generate a state signal SIG1 having a high level voltage, and when the communication state of the main communication line is abnormal, the state signal generation circuit 320 may generate a state signal SIG1 having a low-level voltage.

The signal combination circuit 310 may generate an output signal by AND combination of signals. For example, the signal combination circuit 310 may generate an output signal by AND combination of an input signal received from the auxiliary communication input terminal TML1 and a state signal SIG1 generated by the state signal generation circuit 320.

The first data driving integrated circuit may further include a performance evaluation feedback circuit 330, and the performance evaluation feedback circuit 330 may evaluate communication performance of the main communication line and generate a performance evaluation feedback signal SIG2 indicating the communication performance.

In addition, the signal combination circuit 310 may generate an output signal by combining the state signal SIG1 and the performance evaluation feedback signal SIG2.

For example, the first data driving integrated circuit may receive a bit error rate (BER) test pattern from the data processing device and evaluate communication performance based on a recognition rate of the bit error rate (BER) test pattern. In addition, when the recognition rate is equal to or greater than a given level, the performance evaluation feedback circuit 330 may generate a performance evaluation feedback signal SIG2 having a high level voltage, and when the recognition rate is less than the given level, the performance evaluation feedback circuit 330 may generate a performance evaluation feedback signal SIG2 having a low-level voltage.

The signal combination circuit 310 may have various combination modes. For example, in a first combination mode, the signal combination circuit 310 may generate an output signal by AND combination of only an input signal received from the auxiliary communication input terminal TML1 and a state signal SIG1 generated by the state signal generation circuit 320. Further, the signal combination circuit 310 may generate an output signal by AND combination of only the state signal SIG1 and the performance evaluation feedback signal SIG2 in a second combination mode. In addition, the signal combination circuit 310 may bypass the input signal as it is as an output signal in a third combination mode.

FIG. 3 illustrates a part of processing the auxiliary communication signal in the first data driving integrated circuit, and the same components may be included in the other data driving integrated circuits. Each data driving integrated circuit may differ only in the arrangement position in the cascade.

Referring to FIGS. 2 and 3, each of the data driving integrated circuits 120*a*, 120*b*, 120*c*, and 120*d* may include the same terminals TML1 and TML2 as the first data driving integrated circuit 120*a*, and may include a signal combination circuit 310, a state signal generation circuit 320, and a performance evaluation feedback circuit 330, and the like. With respect to the connection relationship of the auxiliary communication, the auxiliary communication input terminal of the first data driving integrated circuit 120*a* disposed at the beginning of the cascade may be connected to the data processing device 110, and the auxiliary communication output terminal may be connected to the second data driving integrated circuit 120*b*. Further, the auxiliary communication input terminal of the fourth data driving integrated circuit 120*d* disposed at the end of the cascade may be connected to the third data driving integrated circuit 120*c*, and the auxiliary communication output terminal may be connected to the data processing device 110.

Each of the data driving integrated circuits 120*a*, 120*b*, 120*c*, and 120*d* can confirm whether an abnormality has occurred in itself or other data driving integrated circuits through a cascade connection structure and an auxiliary communication feedback signal LCKf.

As an example, the fourth data driving integrated circuit 120*d* may determine that an abnormality has occurred in itself when the internal state signal SIG1 has a low-level voltage. In addition, when the input signal has a low-level voltage, the fourth data driving integrated circuit 120*d* may determine that an abnormality has occurred in at least one of the first data driving integrated circuit 120*a*, the second data driving integrated circuit 120*b* and the third data driving integrated circuit 120*c*.

As another example, the first data driving integrated circuit 120*a* may determine that an abnormality has occurred in itself when the internal state signal SIG1 has a low-level voltage. In addition, when the input signal has a low-level voltage, the first data driving integrated circuit 120*a* may determine that an abnormality has occurred in at least one of the second data driving integrated circuit 120*b*, the third data driving integrated circuit 120*c*, and the fourth data driving integrated circuit 120*d*. The first data driving integrated circuit 120*a* receives the auxiliary communication feedback signal LCKf from the data processing device 110. Meanwhile, since the data processing device 110 generates the auxiliary communication feedback signal LCKf according to the fourth auxiliary communication signal LCKd reflecting the state of the data driving integrated circuits 120*a*, 120*b*, 120*c*, and 120*d*, the first data driving integrated circuit 120*a* can determine the state of each of the data driving integrated circuits 120*a*, 120*b*, 120*c*, and 120*d*.

When one data driving integrated circuit determines that an abnormality has occurred in itself or another data driving integrated circuit, the one data driving integrated circuit may switch to a mode corresponding to the abnormality.

For example, when the first data driving integrated circuit 120*a* determines that an abnormality has occurred in itself or at least one of the second data driving integrated circuit 120*b*, the third data driving integrated circuit 120*c*, and the fourth data driving integrated circuit 120*d*, the first data driving integrated circuit 120*a* can switch to a mode for retraining the communication clock of the main communication line. When it is determined that communication in the main communication line is abnormal, the state signal SIG1 may have a low-level voltage, and accordingly, the auxiliary communication signal may have a low-level voltage. Further, when it is confirmed that the auxiliary communication signal has a low-level voltage, the data processing device 110 may switch to a mode for retraining the communication clock of the main communication line and transmit a clock training signal for retraining the communication clock to the data driving integrated circuits 120*a*, 120*b*, 120*c*, and 120*d*.

When an error occurs in a data driving integrated circuit other than the first data driving integrated circuit 120*a* among the data driving integrated circuits 120*a*, 120*b*, 120*c*, and 120*d* in the cascade structure, the first data driving integrated circuit 120*a* may not be able to detect an abnormality in another data driving integrated circuit only with the auxiliary communication signal in the cascade structure. The auxiliary communication feedback signal LCKf is a signal that compensates for such a problem, and enables the data driving integrated circuits 120*a*, 120*b*, 120*c*, and 120*d* bound in one cascade structure to detect abnormalities almost simultaneously.

Meanwhile, the data processing device 110 may use the auxiliary communication feedback signal LCKf for other purposes. For example, the data processing device 110 may transmit a reset signal through the auxiliary communication feedback signal LCKf. The data processing device 110 may generate a reset signal (e.g., a signal having a low-level voltage) regardless of the fourth auxiliary communication signal LCKd, and transmit the reset signal to the first data driving integrated circuit 120*a* through the auxiliary communication feedback line CLAF. Further, reset signals may be sequentially propagated through auxiliary communication of cascade structures of each of the data driving integrated circuits 120*a*, 120*b*, 120*c*, and 120*d*. Through such auxiliary communication, all of the data driving integrated circuits 120*a*, 120*b*, 120*c*, and 120*d* may receive a reset signal.

When the reset signal is received, each of the data driving integrated circuits 120*a*, 120*b*, 120*c*, and 120*d* may enter an initialization state. For example, each of the data driving integrated circuits 120*a*, 120*b*, 120*c*, and 120*d* may lower the data rate of the main communication through the main communication line after receiving the reset signal.

In summary, the data driving device may include a plurality of data driving integrated circuits for receiving image data from the data processing device through the main communication line. The plurality of data driving integrated circuits may be connected in the form of a cascade through auxiliary communication. The fourth data driving integrated circuit disposed at the end of the cascade may transmit the fourth auxiliary communication signal to the data processing device through auxiliary communication, and the first data driving integrated circuit disposed at the beginning of the cascade may receive the auxiliary communication feedback signal for the fourth auxiliary communication signal from the data processing device.

Each data driving integrated circuit may perform auxiliary communication by combining the input signal received from the auxiliary communication input terminal and the state signal indicating a communication state of the main communication line to output it to the auxiliary communication output terminal. In addition, each data driving integrated circuit may output the auxiliary communication signal obtained by AND combination of the input signal and the state signal to the auxiliary communication output terminal.

The auxiliary communication output terminal of the fourth data driving integrated circuit may be connected to the data processing device, and the auxiliary communication input terminal of the first data driving integrated circuit may be connected to the data processing device.

Each data driving integrated circuit may determine that an abnormality has occurred in at least one data driving integrated circuit among the plurality of data driving integrated circuits when the input signal or the state signal has a low-level voltage.

Each data driving integrated circuit may switch to a mode for retraining the communication clock of the main communication line when the input signal or the state signal has a low-level voltage.

When the first auxiliary communication signal has a low-level voltage, the data processing device may generate and transmit the auxiliary communication feedback signal of a low-level voltage.

The data processing device may transmit a reset signal through the feedback signal, and the plurality of data driving integrated circuits may receive the reset signal through auxiliary communication. Further, each data driving integrated circuit may lower the data rate of the main communication through the main communication line after receiving the reset signal. In addition, each data driving integrated circuit may receive image data in a high-speed mode, and receive setting data for the high-speed mode in a low-speed mode having a lower data rate than that in the high-speed mode.

The data processing device may include the main communication circuit and the auxiliary communication circuit. Further, the main communication circuit may transmit the image data to the plurality of data driving integrated circuits through the main communication lines. In addition, the auxiliary communication circuit may receive the fourth auxiliary communication signal from the fourth data driving integrated circuit disposed at the end of the cascade among the plurality of data driving integrated circuits in which auxiliary communication is connected in a cascade form, and transmit the auxiliary communication feedback signal for the auxiliary communication signal to the first data driving integrated circuit disposed at the beginning of the cascade.

The main communication circuit may transmit the clock training signal for retraining the communication clock of image data to the main communication lines when the fourth auxiliary communication signal indicates an abnormal state of at least one of the main communication lines.

Further, the main communication circuit may transmit image data in the high-speed mode and transmit setting data for the high-speed mode to the main communication lines in a low-speed mode having a lower data rate than that in the high-speed mode.

In addition, the main communication circuit may switch from the high-speed mode to the low-speed mode when the fourth auxiliary communication signal indicates an abnormal state of at least one of the main communication lines.

The auxiliary communication circuit may transmit the reset signal through the auxiliary communication feedback signal to reset the plurality of data driving integrated circuits.

In addition, when the fourth auxiliary communication signal has a low-level voltage, the auxiliary communication circuit may generate and transmit the feedback signal of a low-level voltage. Furthermore, when the fourth auxiliary communication signal has the low-level voltage, the main communication circuit may transmit the clock training signal for retraining the communication clock of the image data to the main communication lines.

Figure 4:
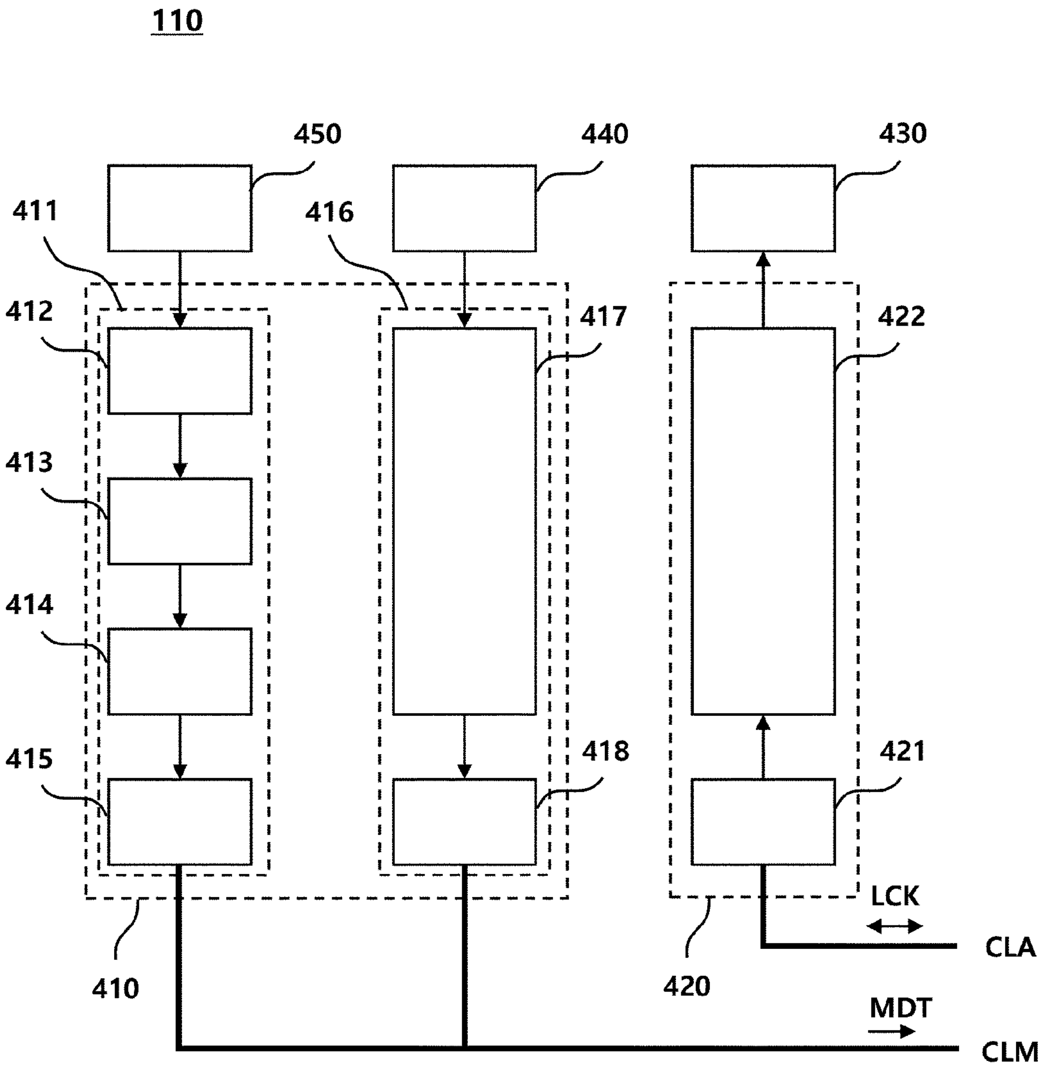
FIG. 4 is a configuration diagram of a data processing device according to one embodiment.

FIG. 4 is a configuration diagram of the data processing device according to one embodiment.

Referring to FIG. 4, the data processing device may include a P-main communication circuit 410, a P-auxiliary communication circuit 420, a P-control circuit 430, a P-memory 440, and an image data processing circuit 450.

The P-main communication circuit 410 may transmit the main communication signal MDT to the data driving device through the main communication line CLM. The P-main communication circuit 410 may transmit image data and a first control data in an active section through the main communication line CLM, and may transmit a second control data in a blank section. In addition, the data driving device may drive the pixels of the display panel according to the image data. The first control data may include a control value applied in line unit or pixel unit of the display panel, and the second control data may include a control value applied in a period longer than the line unit or the pixel unit or a control value applied in a frame unit.

The P-main communication circuit 410 may transmit the setting data at a first data rate through the main communication line CLM. In addition, the P-main communication circuit 410 may transmit the image data, the first control data, and the second control data at a second data rate higher than the first data rate through the main communication line CLM. A mode in which communication is performed at the first data rate may be referred to as a low-speed communication mode, and a mode in which communication is performed at the second data rate may be referred to as a high-speed communication mode.

The P-main communication circuit 410 may include a P-high speed communication circuit 411 for performing high-speed communication and a P-low speed communication circuit 416 for performing low-speed communication.

The P-high speed communication circuit 411 may include a packer 412, a scrambler 413, an encoder 414, a first serializer 415, and the like.

The packer 412 may receive image data from the image data processing circuit 450 that processes the image data. In addition, the packer 412 may receive the first control data and/or the second control data from the P-control circuit 430 or the P-memory 440. The packer 412 may generate transmission data by packaging at least one of the image data, the first control data, and the second control data.

The scrambler 413 may scramble the transmission data. Scrambling is a process of mixing each bit of transmitted data to prevent a same bit (e.g., 1 or 0) from being continuously arranged K (K is a natural number equal to or greater than 2) times in the transmission stream of data. Scrambling is performed according to a prescribed protocol. According to the prescribed protocol, the data driving device can restore the stream in which each bit is mixed back to the original data.

The scrambler 413 may scramble only image data and may not apply scrambling to the first control data or the second control data.

The encoder 414 may encode P number of bits of a transmission stream into Q number of bits in transmission data. P may be, for example, 6, and Q may be, for example, 7. Encoding 6-bit data into 7-bit data is also called 6B7B encoding. 6B7B encoding is a kind of encoding method with DC balance code.

The encoder 414 may encode the transmission data so that the bits of the transmission stream are incremented. And, the encoded data may be decoded into a DC balance code (e.g., 6B7B) by the data driver. In another aspect, the encoded transmission data may be restored to the original bits by a data driver.

The encoder 414 may use a limited run length code (LRLC) in encoding transmission data. "Run Length" means that a same bit is arranged continuously, and the LRLC encodes the transmission data so that "Run Length" does not appear to be more than a given size in the transmission data.

When the encoder 414 encodes data using the LRLC, the data driving device may decode the data according to the LRLC method used by the encoder 414.

The encoder 414 may divide the transmission data into predetermined units and encode the transmission data for each unit data. Then, the encoder 414 may perform DC balance coding or LRLC coding according to an encoding table stored in the P-memory 440. The data driving device has a decoding table corresponding to the encoding table, and may perform decoding for each unit data according to the decoding table.

The transmission data transmitted in parallel in the data processing device 110 may be converted in series by the first serializer 415. Then, the first serializer 415 may transmit the transmission data converted in series to the data driving device. In this case, a series of data transmitted in series may form a transmission stream, and may be in the form of a main communication signal MDT as a signal.

The main communication line CLM may include m (m is a natural number) number of lines electrically insulated. In addition, the m number of lines may be paired in a plurality of pairs, each pair enabling low voltage differential signaling (LVDS) communication. When the main communication line CLM includes two or more pairs, the first serializer 415 may distribute and transmit transmission data in each pair.

The transmission data may be composed of bits, and a plurality of bits may constitute one symbol. One symbol may be composed of 8 bits or 10 bits. Further, a plurality of symbols may constitute one pixel data. The pixel data may sequentially include information corresponding to sub-pixels such as R (Red), G (Green), B (Blue), and the like. The data driving device may align data, which are received in series in bit units, in byte units and in pixel units.

The P-low speed communication circuit 416 may include a setting data processing circuit 417 and a second serializer 418.

The setting data processing circuit 417 may receive a setting value from the P-memory 440 and/or the P-control circuit 430 and generate setting data corresponding to the setting value.

The setting data is data transmitted at a low speed and may include a setting value of the data driving device necessary before high-speed communication. For example, the setting data may include setting values of a circuit that performs high-speed communication in the data driving device.

The second serializer 418 may serially convert the setting data, and transmit the serially converted setting data to the data driving device through the main communication line CLM.

The second serializer 418 may convert the setting data into a Manchester code form and transmit it.

Figure 5:
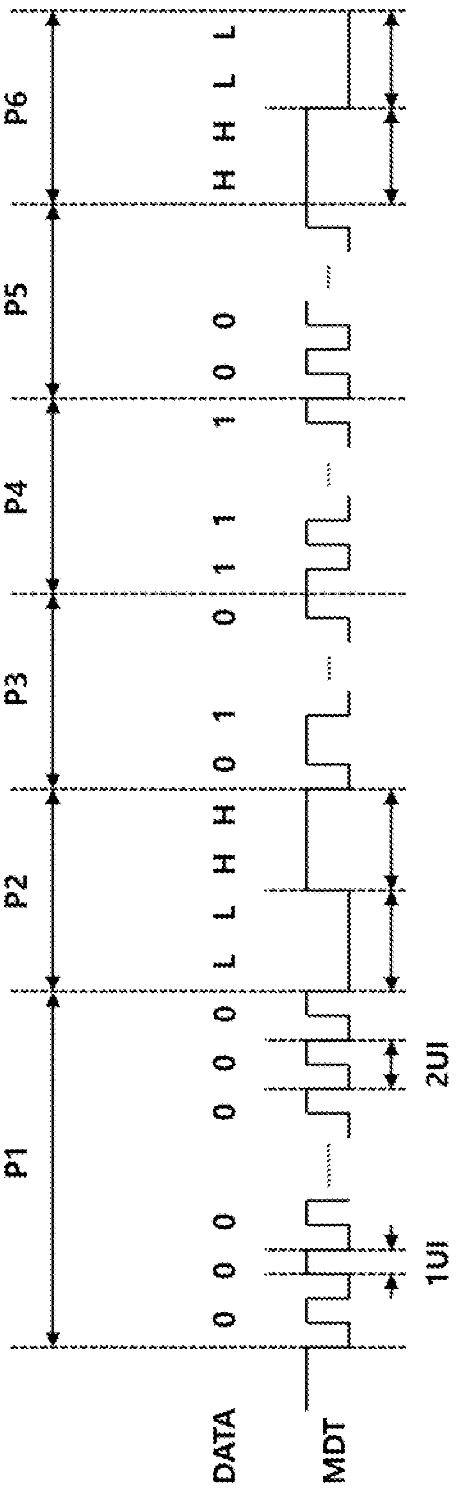
FIG. 5 is an exemplary diagram showing a protocol of a main communication signal transmitted in a Manchester code.

FIG. 5 is an exemplary diagram showing a protocol of a main communication signal transmitted in a Manchester code.

Referring to FIG. 5, the main communication signal transmitted in the Manchester code may be composed of six parts P1 to P6.

A low-speed communication clock may be transmitted through the first part P1. In the main communication signal, data bits may be encoded in Manchester-II codes, and in this case, one bit may be composed of two unit pulses UI. In Manchester-II coding, when the data bits transmitted in the first part P1 represent all 0 or 1, a pulse synchronized with the low-speed communication clock may be transmitted.

The receiving side (data driving device) may perform training according to the low-speed communication clock received from the first part P1.

After the low-speed communication clock is transmitted, a start signal indicating the start of a message may be transmitted in the second part P2, and an end signal indicating the end of the message may be transmitted in the sixth part P6, which is the last part of the message.

In the third part P3, a message header is transmitted. The message header may include parameter values such as data type, mode, identification number (ID) of the receiving side, data length, and a setting register address of the receiving side.

Further, the fourth part P4 may include information transmitted/received through a message.

In addition, the fifth part P5 may include a cyclical redundancy check (CRC) value.

Referring back to FIG. 4, the data processing device may include a P-auxiliary communication circuit 420, and the P-auxiliary communication circuit 420 may include a P-auxiliary communication control circuit 422 and a P-auxiliary communication signal processing circuit 421.

The P-auxiliary communication signal processing circuit 421 may receive the auxiliary communication signal LCK from the auxiliary communication line CLA or transmit the auxiliary communication signal LCK to the auxiliary communication line CLA. The auxiliary communication signal (LCK) to be transmitted may be referred to as an auxiliary communication feedback signal.

The P-auxiliary communication control circuit 422 checks the auxiliary communication signal LCK received from the auxiliary communication line CLA and in case that the auxiliary communication signal LCK indicates an abnormality in the data driving device, the P-auxiliary communication control circuit 422 may transmit the auxiliary communication feedback signal having the same form as the auxiliary communication signal LCK to the auxiliary communication line CLA. Here, the line for receiving the auxiliary communication signal LCK from the data driving device and the line for transmitting the auxiliary communication feedback signal may be physically separated lines.

The P-auxiliary communication control circuit 422 may generate an auxiliary communication feedback signal irrespective of the auxiliary communication signal LCK received from the auxiliary communication line CLA and transmit it to the auxiliary communication line CLA. For example, when the P-auxiliary communication control circuit 422 intends to switch the mode of the data driving device, the P-auxiliary communication control circuit 422 may incorporate a reset signal in the auxiliary communication feedback signal and transmit it.

The P-control circuit 430 is a circuit that controls the overall function of the data processing device 110. The P-control circuit 430 may determine an operation mode of the data processing device and may determine circuits performed in each operation mode.

Figure 6:
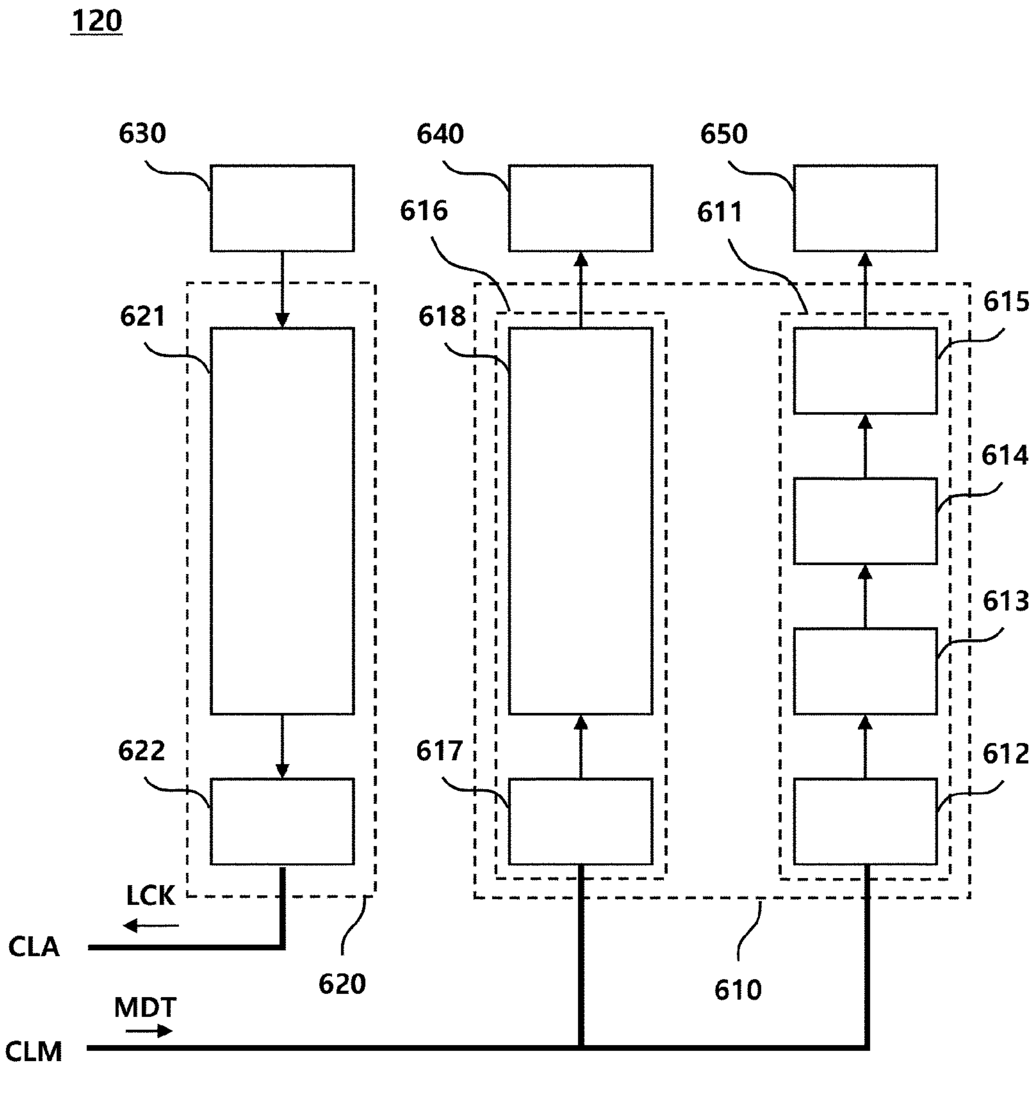
FIG. 6 is a configuration diagram of a data driving device according to one embodiment.

FIG. 6 is a configuration diagram of the data driving device according to one embodiment. When the data driving device includes a plurality of data driving integrated circuits, the configuration shown in FIG. 6 may be understood as a configuration included in one data driving integrated circuit.

Referring to FIG. 6, the data driving device 120 includes a D-main communication circuit 610, a D-auxiliary communication circuit 620, a D-control circuit 630, a D-memory 640 and a data driving circuit 650, and the like.

The D-main communication circuit 610 may receive the main communication signal MDT from the data processing device through the main communication line CLM. The D-main communication circuit 610 may receive the image data and the first control data in the active section through the main communication line CLM, and may receive the second control data in the blank section. In addition, the data driving circuit 650 may drive pixels of the display panel according to the image data. The first control data may include a control value applied in line unit or pixel unit of the display panel, and the second control data may include a control value applied in a longer period than the line unit or the pixel unit or a control value applied in frame unit.

The D-main communication circuit 610 may receive the setting data at a first data rate through the main communication line CLM. In addition, the D-main communication circuit 610 may receive the image data, the first control data, and the second control data at a second data rate higher than the first data rate through the main communication line CLM. A mode in which communication is performed at the first data rate may be referred to as a low-speed communication mode, and a mode in which communication is performed at the second data rate may be referred to as a high-speed communication mode.

The D-main communication circuit 610 may include a D-high speed communication circuit 611 that performs high-speed communication and a D-low speed communication circuit 616 that performs low-speed communication.

The D-main communication circuit 610 may include a first de-serializer 612, a decoder 613, a descrambler 614, and an unpacker 615, and the like.

The first deserializer 612 may parallelize the main communication signal MDT received in series through the main communication line CLM in byte unit or symbol unit.

In addition, the decoder 613 may decode data encoded with a DC balance code (e.g., 6B7B code) or encoded with LRLC.

The decoder 613 may perform decoding for each unit data according to a decoding table stored in the D-memory 640. In this case, when it is confirmed that one unit data included in the data is not included in the decoding table, the decoder 613 may generate an error signal.

Then, the decoder 613 may check whether the received data satisfies the LRLC coding criteria. For example, the decoder 613 may generate an error signal when it is confirmed that the run-length of the received data exceeds a reference value.

The descrambler 614 may restore the scrambled data to the original data according to a prescribed protocol.

The unpacker 615 may align the received data in pixel unit and transmit image data for each pixel to the data driving circuit 650.

The D-low speed communication circuit 616 may include a second deserializer 617 and a setting data storage circuit 618.

The second deserializer 617 may parallelize the setting data serially received through the main communication line CLM. The setting data may be received in the form of a Manchester code, and the second deserializer 617 may decode the received setting data into the Manchester code and then transmit it to the setting data storage circuit 618.

The setting data storage circuit 618 may receive the setting data and store setting values included in the setting data in the D-memory 640 or apply it to a circuit corresponding to the setting value.

The P-memory in the data processing device and the D-memory in the data driving device may be in the form of registers, read only memory (ROM) or random access memory (RAM).

The D-auxiliary communication circuit 620 may include a D-auxiliary communication control circuit 621 and a D-auxiliary communication signal processing circuit 622.

The D-auxiliary communication control circuit 621 may include the state signal generation circuit 320 (see FIG. 3) and the performance evaluation feedback circuit 330 (see FIG. 3) described with reference to FIG. 3, and the D-auxiliary communication signal processing circuit 622 may include the signal combination circuit 310 (see FIG. 3) described with reference to FIG. 3.

The D-auxiliary communication control circuit 621 may check an abnormal state of the main communication signal MDT, an abnormal state of the main communication circuit 610 and/or an abnormal state of other components, and generate a state signal. Alternatively, the D-auxiliary communication control circuit 621 may evaluate the performance of the main communication based on a recognition rate of the test pattern received to evaluate the performance of the main communication, and generate a performance evaluation feedback signal according to the evaluation result.

The D-auxiliary communication signal processing circuit 622 may generate the auxiliary communication signal LCK using the state signal or the performance evaluation feedback signal, and transmit the auxiliary communication signal LCK to the auxiliary communication line CLA.

The D-auxiliary communication signal processing circuit 622 combines the auxiliary communication signal transmitted from another data driving integrated circuit through the auxiliary communication line CLA or the auxiliary communication feedback signal transmitted from the data processing device and the state signal or the performance evaluation feedback signal to generate the auxiliary communication signal LCK.

The D-control circuit 630 is a circuit that controls the overall function of the data driving device 120. The D-control circuit 630 may determine an operation mode of the data driving device, and may determine circuits performed in each operation mode.

Figure 7:
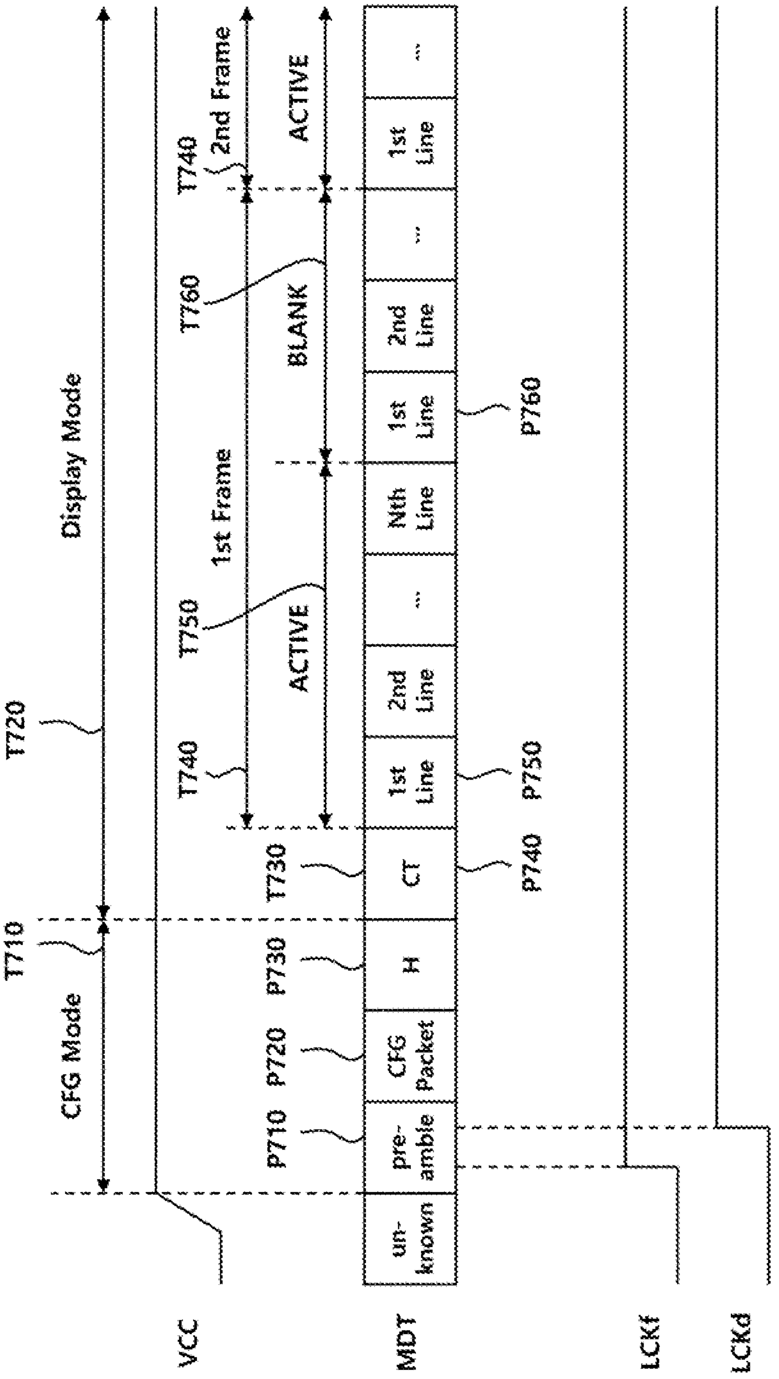
FIG. 7 is a diagram illustrating a sequence of main signals according to one embodiment.

FIG. 7 is a diagram illustrating a sequence of main signals according to one embodiment.

Referring to FIG. 7, a waveform of a driving voltage VCC is illustrated. The driving voltage VCC initially has a low-level voltage, and then the waveform changes to a high-level voltage at a certain point. The time when the driving voltage VCC is changed to the high-level voltage can be understood as a driving time of a display driving device (e.g., the data processing device or the data driving device).

After the driving time, the data processing device and the data driving device may operate in a setting data mode. Further, after the operation in the setting data mode is completed, the data processing device and the data driving device may operate in a display mode.

In a setting data section T710, the data processing device may continuously transmit a preamble packet P710 and a setting data packet P720 through the main communication signal MDT.

The data processing device may change the voltage of the auxiliary communication feedback signal LCKf from a low level to a high level while sending the preamble packet P710. Through this voltage change, the data processing device can notify that the preamble packet is being transmitted to the data driving devices.

The voltage of the main communication signal MDT in the preamble packet P710 may be periodically changed between a high level and a low level, and the data driving device may train a low-speed communication clock for receiving the setting data packet P720 using the preamble packet P710.

The data processing device may transmit the preamble packet P710 and the setting data packet P720 at a relatively low-speed first data rate. The low-speed communication clock becomes the first data rate, and the data driving device may train the low-speed communication clock using the preamble packet P710.

When the low-speed communication clock is trained, the data driving device may notify the data processing device of the clock learning state through the auxiliary communication signal LCKd. For example, the data driving device may change the voltage of the auxiliary communication signal LCKd from a low level to a high level when the low-speed communication clock is trained. The waveform of the auxiliary communication signal LCKd illustrated in FIG. 7 is an auxiliary communication signal of the data driving integrated circuit disposed at the end of the plurality of data driving integrated circuits which form a cascade structure in the data driving device.

The data processing device may transmit the setting data packet P720 after confirming that the data driving device has trained the low-speed communication clock through the auxiliary communication signal LCKd.

Figure 8:
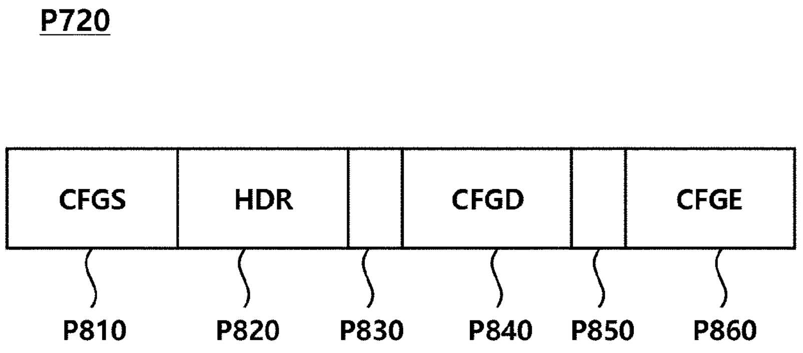
FIG. 8 is a configuration diagram of a setting data packet according to one embodiment.

FIG. 8 is a configuration diagram of the setting data packet according to one embodiment.

Referring to FIG. 8, the setting data packet P720 may include a setting data start packet P810, a setting data header packet P820, a setting data header verification packet P830, a setting data body packet P840, a setting data body verification packet P850 and a setting data end packet P860.

The setting data start packet P810 may indicate the start of the setting data packet P720. Further, the setting data end packet P860 may indicate the end of the setting data packet P720.

The setting data header packet P820 may include an indication value for communication of the setting data body packet P840. For example, the setting data header packet P820 may include an indication value for the length of the setting data body packet P840.

The setting data header verification packet P830 may include a verification value for verifying data validity of the setting data header packet P820. For example, the setting data header verification packet P830 may include a CRC value of the setting data header packet P820.

The setting data body packet P840 may include a setting value of the data driving device required before high-speed communication. For example, the setting data body packet P840 may include setting values of circuits performing high-speed communication in the data driving device.

The setting data body verification packet P850 may include a verification value for verifying the data validity of the setting data body packet P840. For example, the setting data body verification packet P850 may include a CRC value of the setting data body packet P840.

Referring back to FIG. 7, the data processing device may maintain the main communication signal MDT at the high-level voltage or at the low-level voltage for a predetermined time after completing the transmission of the setting data packet P720. Such a packet may be referred to as a high voltage packet or low voltage packet P730, and when the high voltage packet or low voltage packet P730 is received, the data driving device may recognize that the setting data section T710 is completed. When the data driving device receives a signal maintained at the high-level voltage or the low-level voltage for the predetermined time, the clock is broken, and the data driving device may recognize it as the setting data section T710 is completed.

Meanwhile, after recognizing the setting data end packet P860 (see FIG. 8) through the first communication signal MDT, when the first communication signal MDT is maintained at the high-level voltage or the low-level voltage for the predetermined time, the data driving device may determine the end of the setting data section T710 and enter the display section T720.

After the setting data section T710 is completed, the data processing device and the data driving device may enter the display section T720. The display section T720 may include a clock training section T730 and a frame section T740. After the high-speed communication clock is trained in the clock training section T730, the frame section T740 is repeatedly displayed.

In the clock training section T730, the data processing device may transmit a clock training pattern P740 at the second data rate to the data driving device. In addition, the data driving device may train the high-speed communication clock corresponding to the second data rate in the clock training pattern P740. Here, the second data rate may have a higher frequency than that of the first data rate.

When the data driving device fails to train for the high-speed communication clock in the clock training section T730, the data driving device may transmit a clock training failure signal through the auxiliary communication signal LCKd. For example, the data driving device may notify the data processing device of the clock training failure while lowering the voltage of the auxiliary communication signal LCKd from the high level to the low level.

When the clock training for the high-speed communication clock fails, the data processing device may additionally transmit the clock training pattern P740 or return to the setting data mode.

When the clock training for the high-speed communication clock is completed, the data processing device and the data driving device may enter the frame section T740.

The frame section T740 may include an active section T750 and a blank section T760. The active section T750 may be a section in which image data and control data are transmitted in line unit, and the blank section T760 may be a section in which no image data in line unit is transmitted. The blank section T760 may be divided into a horizontal blank section and a vertical blank section. Hereinafter, for convenience of description, the blank section T760 will be described as the vertical blank section.

In the active section T750, the data processing device may transmit a line data packet P750 in each line unit.

Figure 9:
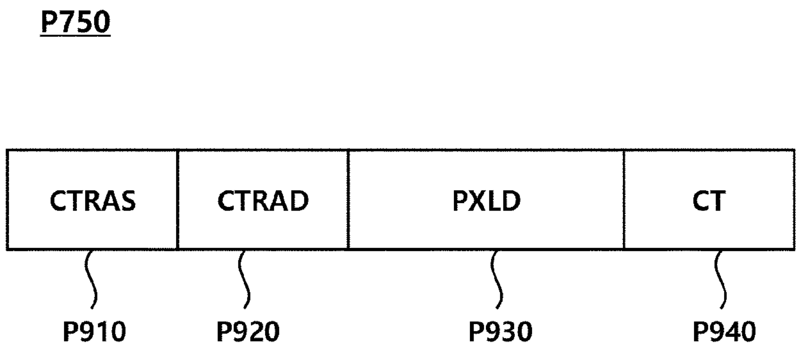
FIG. 9 is a configuration diagram of a line data packet according to one embodiment.

FIG. 9 is a configuration diagram of the line data packet according to one embodiment.

Referring to FIG. 9, the line data packet P750 may include a line data start packet P910, a first control data body packet P920, an image data packet P930, and a clock training pattern P940.

The line data start packet P910 may indicate the start of the line data packet P750. LRLC coding or scrambling may not be applied to the line data start packet P910.

The control data body packet P920 may include setting values that can be changed in line unit or frequently. For example, the first control data body packet P920 may include a polarity value indicating a polarity of each pixel, and may include a value indicating whether the scrambler is reset.

The image data packet P930 may include gradation values of pixels arranged in one line.

In addition, the clock training pattern P940 may include a pattern signal capable of training a high-speed communication clock.

Referring back to FIG. 7, in the active section T750, the data processing device may enter the blank section T760 after transmitting the line data packet P750 for all lines.

In the blank section T760, the data processing device may transmit the control data packet P760 in a virtual line unit.

Figure 10:
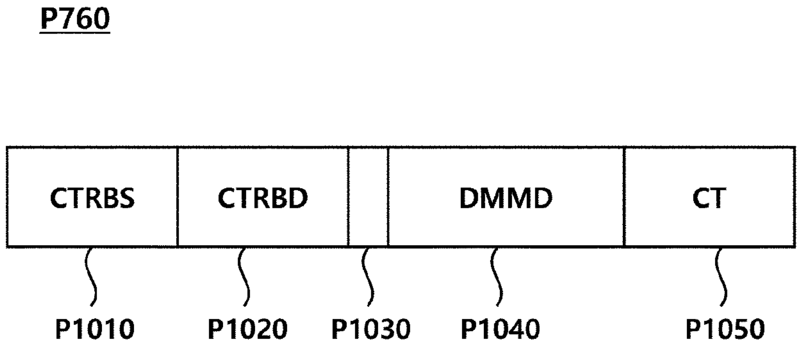
FIG. 10 is a configuration diagram of a control data packet according to one embodiment.

FIG. 10 is a configuration diagram of the control data packet according to one embodiment.

Referring to FIG. 10, the control data packet P760 may include a control data start packet P1010, a second control data body packet P1020, a verification packet P1030, a dummy packet P1040, and a clock training pattern P1050.

The control data start packet P1010 may indicate the start of the control data packet P760. LRLC coding or scrambling may not be applied to the control data start packet P1010.

The second control data body packet P1020 may include setting values that are changed in a frame unit or are not changed frequently. Alternatively, according to one embodiment, the second control data body packet P1020 may include a setting value similar to or equal to that of the first control data body packet.

The verification packet P1030 may include CRC data. Here, the CRC data may include the CRC value received in the setting data section. For example, the CRC data may include a CRC value of the setting data header packet P820 (see FIG. 8) included in the setting data header verification packet P830 (see FIG. 8). Further, the CRC data may include a CRC value of the setting data body packet P840 (see FIG. 8) included in the setting data body verification packet P850 (see FIG. 8).

The data driving device may check a communication error while comparing the CRC value received in the setting data section with the CRC value received in the verification packet P1030.

As described above, in one embodiment, different types of communication are performed for the respective sections. Under these conditions, in one embodiment, there is proposed a data validation method optimized for the communication type in each section in order to increase the efficiency of data validation.

Figure 11:
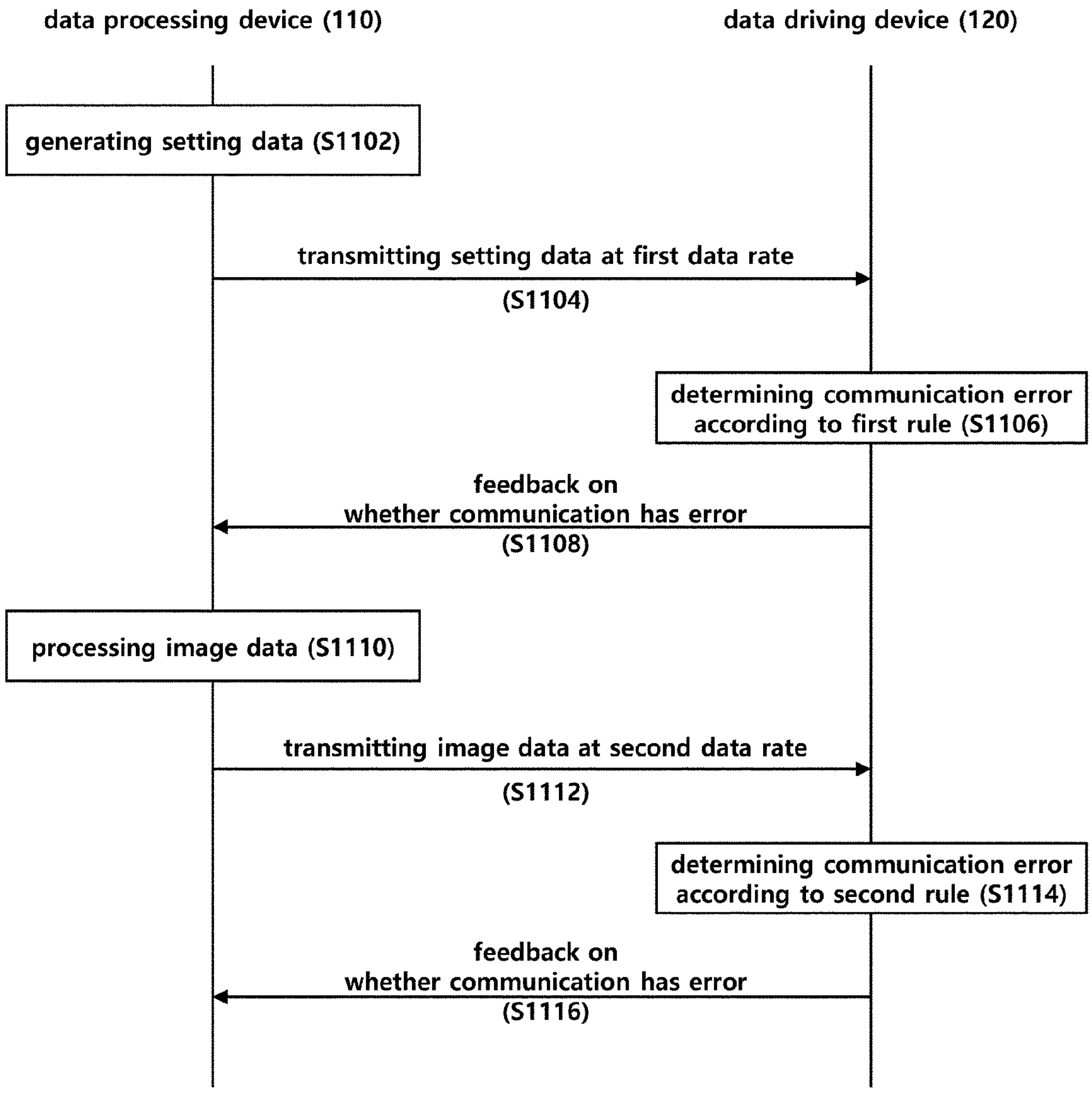
FIG. 11 is a flowchart of a data validation method according to one embodiment.

FIG. 11 is a flowchart of the data validation method according to one embodiment.

Referring to FIG. 11, the data processing device 110 may generate setting data (S1102). The setting data may include high-speed communication setting values for smoothly performing high-speed communication (e.g., communication for transmitting/receiving data at the second data rate).

The data processing device 110 may transmit the setting data at the first data rate to the data driving device 120 through the main communication line. Further, the data driving device 120 may receive the setting data at the first data rate (S1104).

The data driving device 120 may determine an error in the setting data according to a first rule (S1106). In addition, the data driving device 120 may feedback whether the setting data has an error to the data processing device 110 through the auxiliary communication line (S1108).

The data processing device 110 may convert the image data to be suitable for the data driving device 120 (S1110).

In addition, the data processing device 110 may transmit image data at the second data rate to the data driving device 120 through the main communication line. Further, the data driving device 120 may receive image data at the second data rate (S1112). In this case, the second data rate may be higher than the first data rate. Communication at the first data rate may be regarded as low-speed communication, and communication at the second data rate may be regarded as high-speed communication.

The data driving device 120 may determine an error in the image data according to a second rule different from the first rule (S1114). In addition, the data driving device 120 may feedback whether the image data has an error to the data processing device 110 through the auxiliary communication line (S1116).

In the data driving device 120, the communication at the first data rate may be performed by the D-low speed communication circuit, and the communication at the second data rate may be performed by the D-high speed communication circuit.

As an example of determining a communication error, the D-low speed communication circuit may determine an error in the setting data through CRC check.

As another example, when an error is confirmed during decoding of the image data, the D-high speed communication circuit may determine the image data as error data.

When it is confirmed that one unit data included in the image data is not included in the decoding table, the D-high speed communication circuit may determine the image data as error data. The data processing device may perform LRLC coding or 6B7B coding on one unit data, and when the D-high speed communication circuit fails to retrieve the corresponding unit data from the decoding table for LRLC coding or 6B7B coding, it may be determined that there was an error in the communication process of the corresponding unit data.

When the run-length exceeds a reference value in the received image data, the D-high speed communication circuit may determine the image data as error data. Under the situation that the D-high speed communication circuit receives the data wherein the run-length exceeds the reference value although the data processing device transmits image data by LRLC coding such that the run-length does not exceed the reference value, it is highly likely that an error occurs in the communication process. Accordingly, when the run-length exceeds the reference value in the received image data, the D-high speed communication circuit may determine the image data as error data.

Errors may also be double checked. For example, the D-low speed communication circuit may determine an error in the setting data through CRC check. Further, the CRC check value at this time may be stored in the memory. In addition, the D-high speed communication circuit may receive the second control data at the second data rate, and the second control data may include a CRC comparison value. The D-high speed communication circuit may determine a communication error by comparing the CRC comparison value with the CRC check value. There may be an error in the CRC comparison value received by the high-speed communication at the second data rate, or there may be an error in the CRC check value received by the low-speed communication at the first data rate. The D-high speed communication circuit may determine that one of the CRC comparison value and the CRC check value has an error and feedback the communication error to the data processing device.

The main communication signal may be an embedded clock signal. Since a clock is embedded in the main communication signal, the data driving device may need clock training in the initial section of communication.

The D-high speed communication circuit may include a clock recovery circuit, which may receive a clock training signal from the data processing device and train the high-speed communication clock at the second data rate.

The clock training signal may have a certain pattern. For example, the clock training signal may have a pattern in which a high-level voltage and a low-level voltage alternate with the frequency of the second data rate. After the clock recovery circuit receives the clock training signal and completes the training for the high-speed communication clock, the clock recovery circuit may determine a communication error by checking the pattern in the clock training signal. For example, the clock recovery circuit may determine a communication error by recognizing the clock training signal as data after completing the clock training and then checking whether a pattern of the data is normal.

The frequency of the clock restored from the embedded clock signal may also vary slightly. However, when the frequency changes significantly, there is a high possibility of communication errors.

The D-high speed communication circuit receives the clock training signal through the main communication line to train the high-speed communication clock at the second data rate, and receives the embedded clock signal through the main communication line to maintain the high-speed communication clock. And, the D-high speed communication circuit may determine a communication error by comparing the frequency of the high-speed communication clock at the training completion time with the frequency of the high-speed communication clock at a time point after the training completion time. In this case, the clock recovery circuit in the D-high speed communication circuit may have a phase lock loop (PLL) type or a delay lock loop (DLL) type.

Meanwhile, the D-high speed communication circuit may evaluate communication performance through a bit error rate (BER) test pattern received at the second data rate.

The data processing device may transmit the BER test pattern to the data driving device. Further, the data driving device may count the number of reception errors using the BER test pattern. In addition, when the number of reception errors is equal to or greater than a threshold value, the data driving device may feedback communication errors through the auxiliary communication line.

When the data driving device includes a plurality of data driving integrated circuits, the BER tests on the plurality of data driving integrated circuits may be sequentially performed one by one. For example, after the BER test is performed on the first data driving integrated circuit, the BER test on the second data driving integrated circuit may be performed.

The data driving integrated circuit in which the BER test is performed may ignore auxiliary communication signals transmitted from other data driving integrated circuits. In addition, the data driving integrated circuit in which the BER test is performed may bypass the auxiliary communication signal transmitted from other data driving integrated circuits and output it.

Figure 12:
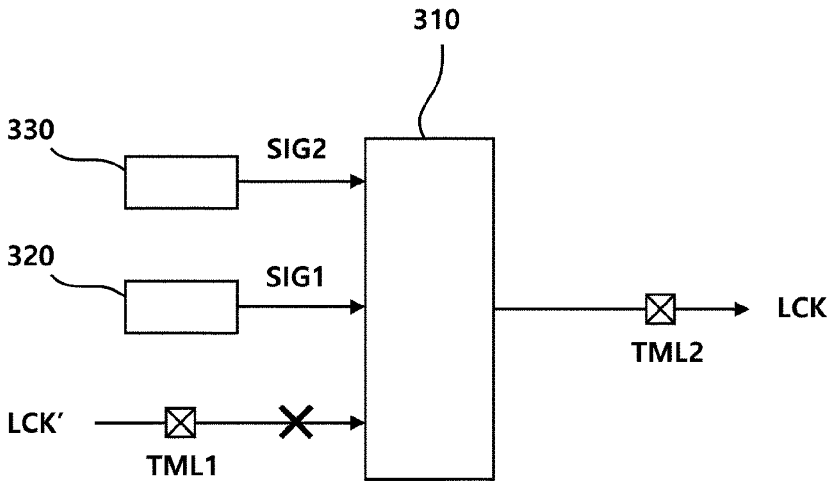
FIG. 12 is a diagram illustrating that in the data driving integrated circuit according to one embodiment, an auxiliary communication signal transmitted from another data driving integrated circuit is ignored.
Figure 13:
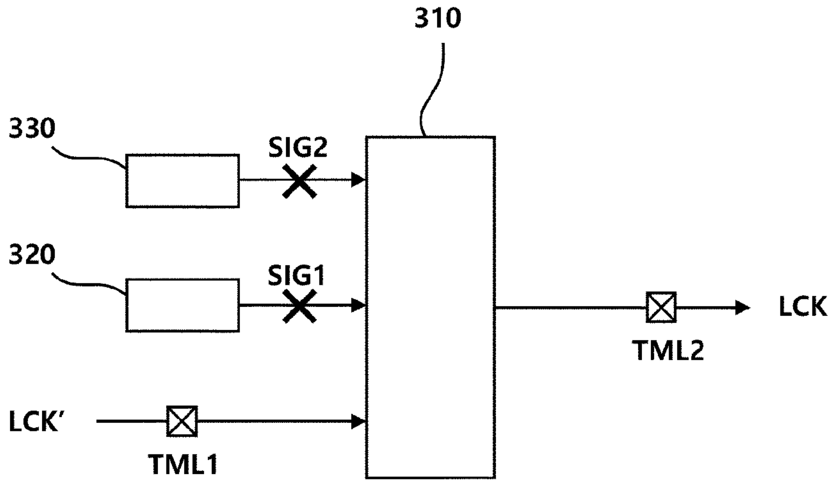
FIG. 13 is a diagram illustrating that in the data driving integrated circuit according to one embodiment, an auxiliary communication signal transmitted from another data driving integrated circuit is bypassed.

FIG. 12 is a diagram illustrating that in the data driving integrated circuit according to one embodiment, an auxiliary communication signal transmitted from another data driving integrated circuit is ignored, and FIG. 13 is a diagram illustrating that in the data driving integrated circuit according to one embodiment, an auxiliary communication signal transmitted from another data driving integrated circuit is bypassed.

Referring to FIG. 12, in the data driving integrated circuit, the performance evaluation feedback circuit 330 may generate the performance evaluation feedback signal SIG2 according to the BER test result. For example, the performance evaluation feedback circuit 330 may lower the voltage of the performance evaluation feedback signal SIG2 from a high level to a low level when the number of reception errors in the BER test is equal to or greater than the threshold value or when a normal reception rate is less than a predetermined value.

In this case, the signal combination circuit 310 may generate the auxiliary communication signal LCK combining the performance evaluation feedback signal SIG2 and the state signal SIG1.

Further, when the performance evaluation feedback circuit 330 performs the BER test, the signal combination circuit 310 may ignore the auxiliary communication signal LCK' received from another data driving integrated circuit.

Referring to FIG. 13, the data driving integrated circuit may not generate the performance evaluation feedback signal SIG2 or the state signal SIG1 when the BER test is not performed. In addition, the signal combination circuit 310 may bypass and output the auxiliary communication signal LCK' received from another data driving integrated circuit.

In this way, the data driving device can individually receive feedback on the BER test results of the data driving integrated circuits.

Meanwhile, the data processing device transmits symbols composed of N (N is a natural number greater than or equal to 2) number of bits, and the data driving device may match each symbol with a value composed of M (M is a natural number less than N) number of bits.

This method of transmitting/receiving symbol-unit bit values may be used to transmit/receive power saving control values, or to transmit/receive packets that need to reduce the possibility of errors, such as the line data packets or the control data packets.

Figure 14:
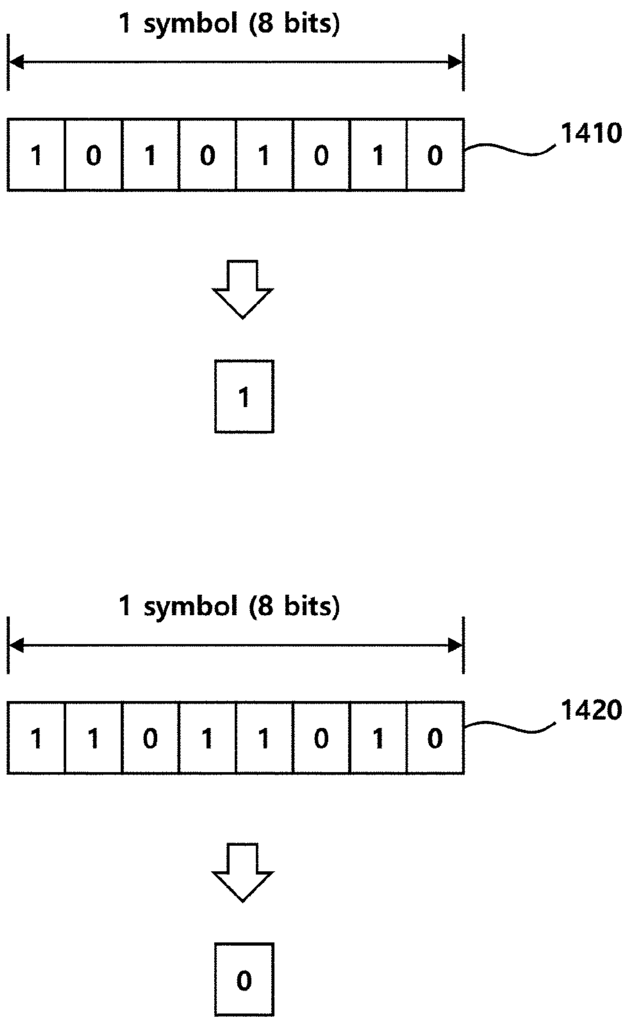
FIG. 14 is an exemplary diagram of a symbol setting value according to one embodiment.

FIG. 14 is an exemplary diagram of a symbol setting value according to one embodiment.

Referring to FIG. 14, the data driving device may receive a first symbol 1410 composed of 8 bits. In addition, the data driving device may match the first symbol 1410 with a 1-bit value having a value of 1.

In addition, the data driving device may receive a second symbol 1420 composed of 8 bits. In addition, the data driving device may match the second symbol 1420 with a 1-bit value having a value of 0.

In this way, when bit values are transmitted and received in a symbol unit, it is possible to reduce the possibility of error in setting values. In addition, even if an error occurs in some bits, the data driving device itself can remedy the error.

Figure 15:
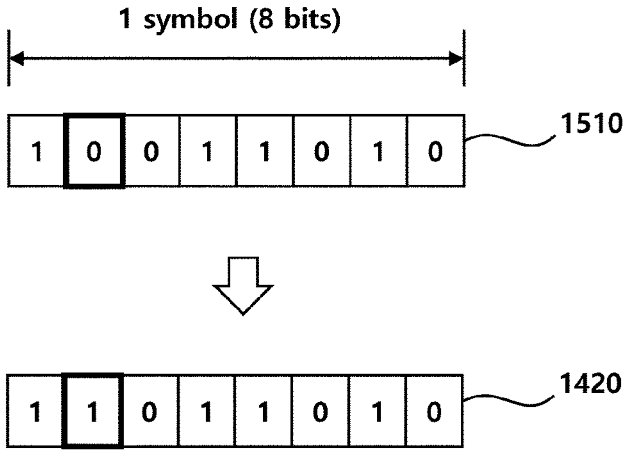
FIG. 15 is a diagram illustrating remedying of a bit error of a symbol according to one embodiment.

FIG. 15 is a diagram illustrating remedying of a bit error of a symbol according to one embodiment.

Referring to FIG. 15, the data driving device may receive a third symbol 1510 composed of 8 bits. When the data driving device is preset to receive only the first symbol and the second symbol described with reference to FIG. 14, the data driving device may determine that there is an error in the third symbol 1510, and compare the third symbol 1510 with the first symbol and/or the second symbol 1420. In addition, the data driving device may select the second symbol 1420 which is more similar to the third symbol 1510, and may remedy the error bit of the third symbol 1510 using the second symbol 1420.

Alternatively, the data driving device may confirm that the third symbol 1510 is not a promised symbol using symbols received before or after receiving the third symbol 1510 and may recover an error of some bits of the third symbol 1510.

Some contents related to the above-mentioned data validity are summarized in view of the data driving device. The data driving device may include the first communication circuit that receives the first data at the first data rate through the communication line and determine an error of the first data according to the first rule, the second communication circuit that receives the second data at the second data rate higher than the first data rate through the communication line and determine an error of the second data according to the second rule different from the first rule, and the data driving circuit that drives the pixels of the display panel according to the image data included in the second data.

The second communication circuit may determine the second data as error data when it is confirmed that one unit data included in the second data is not included in the decoding table.

Further, the second communication circuit may determine the second data as error data when it is confirmed that the run-length exceeds the reference value in the second data.

In addition, the second communication circuit may determine the second data as error data when an error is identified in the decoding process for the second data.

The first communication circuit may determine the error of the first data through a cyclical redundancy check (CRC) check. Further, the first communication circuit may store the CRC check value in the memory, and the second communication circuit may receive the third data at the second data rate, and compare the CRC comparison value included in the third data and the CRC check value to determine a communication error.

The second communication circuit may receive the clock training signal to train the communication clock at the second data rate, and may determine a communication error by checking a clock training pattern in the clock training signal after the training is completed.

The second communication circuit receives the clock training signal through the communication line to train the communication clock at the second data rate, and receives the embedded clock signal through the communication line to maintain the communication clock, and may determine a communication error by comparing the frequency of the communication clock at the training completion time and the frequency of the communication clock at a time point after the training completion time.

The second communication circuit may evaluate communication performance through a bit error rate (BER) test pattern received at the second data rate. Further, the first communication circuit may receive a setting value on the BER test at the first data rate.

The second communication circuit may receive symbols composed of N (N is a natural number of two or more) number of bits through the second data, and may match each symbol to a value composed of M (M is a natural number less than N) number of bits. In addition, the second communication circuit may recover an error of one bit included in one symbol using another symbol received before or after the one symbol.

Some contents related to data validity are summarized in view of the data processing device. The data processing device may include a first communication circuit that transmits first data and first verification data for the first data at a first data rate through a communication line, and a second communication circuit that transmits second data including image data for driving pixels of a display panel at a second data rate higher than the first data rate through the communication line, and transmits second verification data corresponding to the first verification data at the second data rate.

The first verification data may include a cyclic redundancy check (CRC) value with respect to the first data, and the second verification data may include a CRC comparison value corresponding to the CRC value. In addition, the second communication circuit may transmit second data in an active section included in one frame section, and may transmit third data including second verification data in a blank section included in the one frame.

The second communication circuit may encode the second data in the limited run length coding (LRLC) method according to a predetermined encoding table.

The first communication circuit may transmit a setting value for the bit error rate (BER) test at the first data rate, and the second communication circuit may transmit the BER test pattern at the second data rate.

In addition, the second communication circuit may match a value composed of M (M is a natural number) number of bits to a symbol composed of N (N is a natural number greater than M) number of bits, and incorporate the symbol in the second data to transmit it.

When it is determined to be an error in data validity, the data processing device and the data driving device may recover the error while switching the operation modes. Alternatively, when all operations in one mode are completed, the data processing device and the data driving device may switch to another mode.

Figure 16:
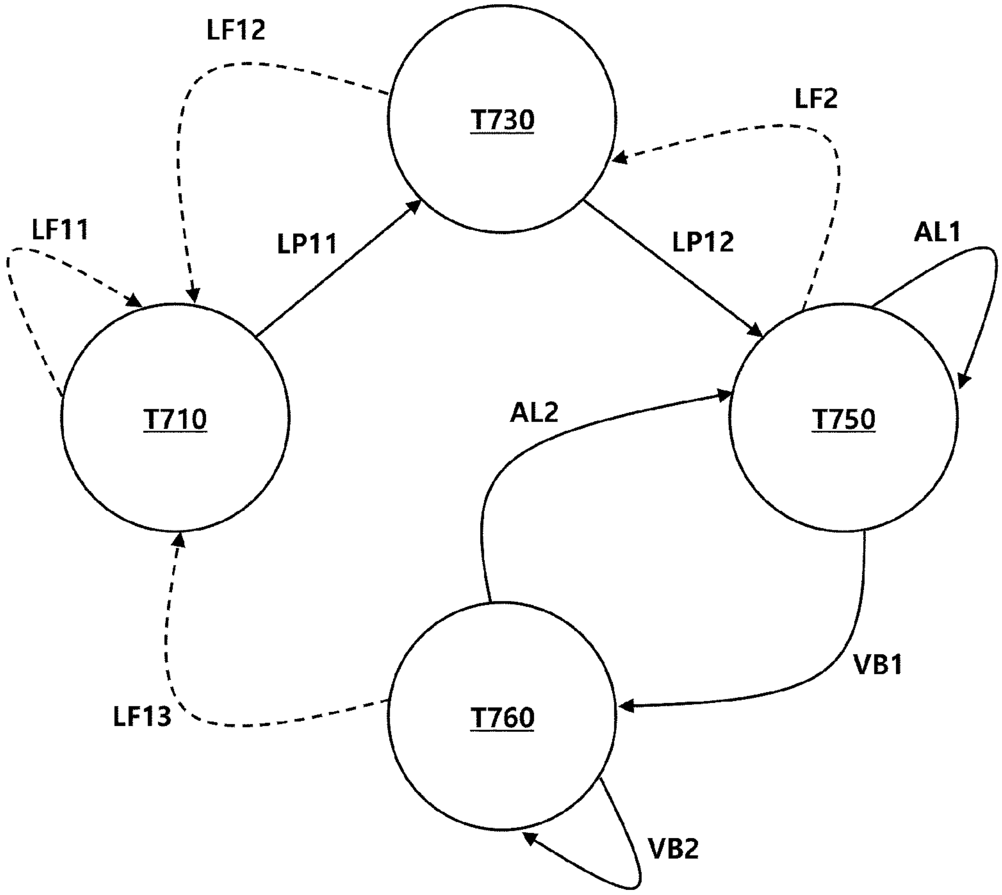
FIG. 16 is a diagram illustrating a mode switching sequence of the display driving apparatus according to one embodiment.

FIG. 16 is a diagram illustrating a mode switching sequence of the display driving apparatus according to one embodiment.

Referring to FIG. 16, in the setting data section T710, the data processing device and the data driving device operate in a first mode and, in the first mode, the P-low speed communication circuit of the data processing device and the D-low speed communication circuit of the data driving device may transmit/receive setting data at the first data rate.

When an error occurs in the first mode (LF11), the data processing device and the data driving device may perform the first mode again.

When all operations in the setting data section T710 are normally performed (LP11), the data processing device and the data driving device may switch from the first mode to a second mode and perform operations in the clock training section T730.

In the second mode, the data processing device transmits a clock training signal at the second data rate, and the data driving device may train a high-speed communication clock to communicate at the second data rate.

When an error occurs in the second mode (LF12), the data processing device and the data driving device may perform the operations of the first mode again after switching to the first mode.

When all operations in the clock training section T730 are normally performed (LP12), the data processing device and the data driving device may switch from the second mode to a third mode and perform operations in the active section T750.

In the third mode, the data processing device transmits image data and first control data at the second data rate, and the data driving device may drive pixels of the display panel according to the image data.

In the third mode, the data processing device and the data driving device may transmit image data and the first control data in line unit, and in this case, when an operation on one line is normally performed (AL1), the same operation on the next line may be performed.

When an error occurs in the third mode (LF2), the data processing device and the data driving device may perform clock training again after switching to the second mode. When an error occurs in the third mode, the data processing device and the data driving device are switched to the second mode not to the first mode, and with this sequence, the data processing device and the data driving device may shorten the error recovery time. In particular, since the third mode is the active section, according to this sequence, the image quality may be improved by minimizing the time period during which the screen is broken.

When all operations in the active section T750 are normally performed (VB1), the data processing device and the data driving device may switch from the third mode to a fourth mode and perform operations in the blank section T760.

In the fourth mode, the data processing device transmits the second control data at the second data rate, and the data driving device may apply a setting value necessary for driving the display panel according to the second control data.

In the fourth mode, the data processing device and the data driving device may transmit second control data in a virtual line unit, and in this case, when an operation on one virtual line is normally performed (VB2), the same operation on the next virtual line may be performed.

When all operations in the blank section T760 are normally performed (AL2), the data processing device and the data driving device may switch from the fourth mode to the third mode and perform operations in the active section T750.

When an error occurs in the fourth mode (LF13), the data processing device and the data driving device may switch to the first mode. The data processing device and the data driving device may determine most of the settings again from the initial state while switching to the first mode. Since the fourth mode is performed in the blank section T760 in which the display panel is not updated, problems in image quality may be minimized even though the recovery time is somewhat long.

With respect to this sequence in view of the data driving device, the data driving device may include a D-low speed communication circuit, a D-high speed communication circuit, a D-control circuit, and a data driving circuit.

The D-slow speed communication circuit may receive setting data at the first data rate in the first mode.

The D-high speed communication circuit may train the high-speed communication clock to communicate with the second data rate in the second mode, receive image data and the first control data using the high-speed communication clock in the third mode, and receive the second control data using the high-speed communication clock in the fourth mode.

The D-control circuit may switch the mode to the second mode when the first mode is completed, switch the mode to the third mode when the second mode is completed, switch the mode to the second mode when the abnormal state is confirmed in the third mode, and switch the mode to the first mode when the abnormal state is confirmed in the fourth mode.

In addition, the data driving circuit may drive pixels of the display panel according to the image data.

Here, the second data rate may be a value higher than the first data rate.

When an abnormal state is confirmed in the second mode, the D-control circuit may switch the mode to the first mode.

The D-high speed communication circuit may include a clock recovery circuit, and the setting data may include a setting value of the clock recovery circuit.

The D-high speed communication circuit may include an equalizer circuit, and the setting data may include a setting value of the equalizer circuit.

When the first mode is repeatedly performed L (L is a natural number of 2 or more) times or more, the setting value of the equalizer circuit may be changed and received. For example, when the operation of switching from the first mode to the second mode is repeatedly performed L times or more within one frame time after switching from the first mode to the second mode, the data processing device may change the setting value of the equalizer circuit of the D-high speed communication circuit and transmit it.

The data driving device may further include a D-auxiliary communication circuit for transmitting an auxiliary communication signal through an auxiliary communication line.

When the D-control circuit checks the abnormal state in the third mode or the fourth mode, the D-auxiliary communication circuit may transmit a signal indicating the abnormal state to the data processing device through the auxiliary communication signal.

The image data, the first control data, and the second control data are embedded clock signals, and the D-high speed communication circuit may extract a clock from the embedded clock signal to maintain the high-speed communication clock.

The D-control circuit may determine an abnormal state when the communication clock is not maintained.

The third mode may be performed in then active section for updating a display in one frame section, and the fourth mode may be performed in the blank section in one frame section.

With respect to this sequence in view of the data processing device, the data processing device may include a P-low speed communication circuit, a P-high speed communication circuit, and a P-control circuit.

The P-low speed communication circuit may transmit setting data at the first data rate in the first mode.

The P-high speed communication circuit may transmit a clock training signal to train the high-speed communication clock at the second data rate in the second mode, transmit image data and first control data according to the high-speed communication clock in the third mode, and transmit the second control data according to the high-speed communication clock in the fourth mode.

The P-control circuit may switch the mode to the second mode when the first mode is completed, switch the mode to the third mode when the second mode is completed, switch the mode to the second mode when the abnormal state is confirmed in the third mode, and switch the mode to the first mode when the abnormal state is confirmed in the fourth mode.

The second data rate may be higher than the first data rate.

When an abnormal state is confirmed in the second mode, the P-control circuit may switch the mode to the first mode.

When switching from the second mode to the first mode is repeated L (L is a natural number of 2 or more) times or more, the P-low speed communication circuit may change a setting value for communication at the second data rate and incorporate the changed setting value in the setting data to transmit it.

The data processing device may further include an auxiliary communication circuit for receiving an auxiliary communication signal through an auxiliary communication line.

In addition, the P-control circuit may check the abnormal state in each mode through the auxiliary communication signal.

In addition, when the auxiliary communication signal is switched from the high-level voltage to the low-level voltage, the P-control circuit may recognize that an abnormal state has occurred.

Meanwhile, the display driving apparatus according to one embodiment may further perform a low-power operation.

Figure 17:
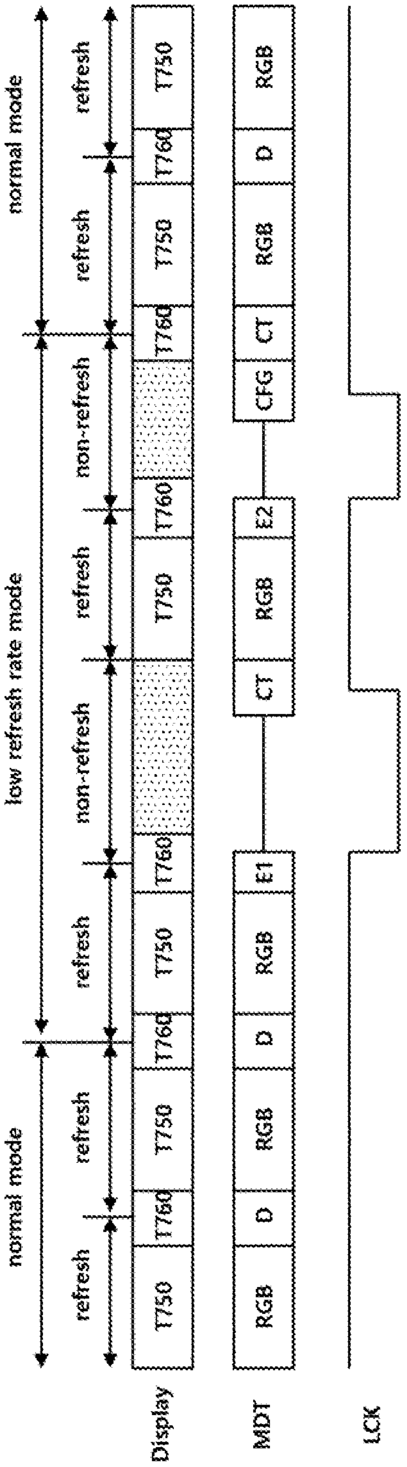
FIG. 17 is a diagram illustrating a sequence in which the display driving apparatus according to one embodiment performs a low-power operation.

FIG. 17 is a diagram illustrating a sequence in which the display driving apparatus according to one embodiment performs a low-power operation.

Referring to FIG. 17, in a normal mode, the display apparatus may alternately perform an operation in the active section T750 and an operation in the blank section T760. In addition, the display apparatus may refresh the image of the display panel in the active section T750.

In order to update the image of the display panel, the data processing device may transmit image data RGB to the data driving device in the active section T750. The image data RGB may be transmitted in line unit, and in order to transmit a setting value in line unit, the data processing device may further transmit the first control data in the active section T750.

Meanwhile, for a low-power operation, the data processing device may transmit the second control data in the blank section T760. Further, the second control data may include a power saving control value for the low-power operation.

In the normal mode, the power saving control value may be set to disable D and transmitted. When the power saving control value set to disable D is received, the data driving device may control the output circuit to operate normally.

In order to lower a refresh rate in a power saving mode, the data processing device may set the power saving control value to enable E1 and E2 and transmit it.

When a power saving control value set to enable E1 and E2 is received, the data driving device may disable some circuits. For example, the data driving circuit of the data driving device may include a latch circuit that latches image data for each pixel, a digital-analog-converter (DAC) that converts output data of the latch circuit into an analog data voltage, and an output buffer that outputs the data voltage to pixels. In addition, the data driving device may determine on/off of the DAC and the output buffer according to the power saving control value.

When a power saving control value set to enable E1 and E2 is received, the data driving device may also disable the main communication circuit. In this case, since the high-speed communication clock is not restored when the main communication circuit is disabled, the data driving device may switch the voltage of the auxiliary communication signal LCK to a low level. The data processing device recognizes this switching of the auxiliary communication signal LCK voltage and may confirm that the data driving device has entered the power saving mode.

The main communication circuit may receive a clock training signal and train a high-speed communication clock or may receive an embedded clock signal and maintain the high-speed communication clock. However, when the main communication signal is not supplied in the power saving mode, the data driving device cannot maintain the high-speed communication clock. Accordingly, the data driving device may transmit the clock running signal CT to the data driving device before the active section T750 is restarted. In addition, the data driving device may train the high-speed communication clock again through the clock training signal CT, and may notify the data processing device of the completion of the training through the auxiliary communication signal LCK.

When switching from the power saving mode to the normal mode, the display device may transmit the setting data CFG again. The image data RGB may be transmitted at a second data rate, and the setting data CFG may be transmitted at a first data rate lower than the second data rate.

When the operation of receiving the setting data CFG is completed, the data driving device may switch the voltage of the auxiliary communication signal LCK from a low level to a high level.

Whether to restart the data driving device from clock training for the high-speed communication clock after the power saving mode or to transmit/receive the setting data again may be determined according to the power saving control value.

The power saving control value may include a first power saving control value and a second power saving control value.

Here, the first power saving control value may include a value determining whether to enter the power saving mode. For example, when the first power saving control value is set to enable, the data driving device may enter the power saving mode, and when the first power saving control value is set to disable, the data driving device may operate in a normal mode without entering the power saving mode.

Next, the second power saving control value may indicate which process to restart after the power saving mode is completed. For example, if the second power saving control value is a value indicating the display mode, the data processing device and the data driving device may restart from the clock training process for high-speed communication. Further, when the second power saving control value is a value indicating the setting data mode, the data processing device and the data driving device may restart from the process of transmitting and receiving the setting data through low-speed communication.

With respect to some of the contents related to the above-described power saving operation in view of the data driving device, the data driving device may include a D-main communication circuit and a data driving circuit. The D-main communication circuit may receive image data and first control data in an active section through a main communication line, and may receive second control data in a blank section. In addition, the data driving circuit may drive the pixels of the display panel according to the image data, and may determine the power saving operation of the output circuit according to the power saving control value included in the second control data.

The data driving circuit may also control the power saving operation of the D-main communication circuit according to the power saving control value.

The data driving device may further include a D-auxiliary communication circuit that transmits an auxiliary communication signal through an auxiliary communication line and indicates that the D-main communication circuit has entered a power saving mode through the auxiliary communication signal.

The D-main communication circuit receives a clock training signal to train a high-speed communication clock for receiving image data, and the auxiliary communication signal may indicate that the D-main communication circuit enters a normal mode after the high-speed communication clock is trained.

The power saving control value may include a first power saving control value which controls a power saving operation of the D-main communication circuit and a second power saving control value which controls a procedure for switching from the power saving mode to the normal mode.

When the second power saving control value is a first value, the D-main communication circuit may receive a clock training signal to train a high-speed communication clock for receiving image data.

When the second power saving control value is a second value, the D-main communication circuit may wait for data reception at a first data rate lower than a second data rate for receiving image data.

The D-main communication circuit may receive a clock training signal corresponding at the second data rate after receiving setting data at the first data rate.

The D-main communication circuit may receive symbols composed of N (N is a natural number of 2 or more) number of bits, and may match each symbol to a power saving control value composed of M (natural number less than N) number of bits.

The data driving circuit includes a latch circuit that latches image data for each pixel, a digital-analog-converter (DAC) that converts output data of the latch circuit into an analog data voltage, and an output buffer that outputs the data voltage to pixels, and may determine on/off of the DAC and the output buffer according to the power saving control value.

With respect to some of the contents related to the above-described power saving operation in view of the data processing device, the data processing device may include an image data processing circuit and a P-main communication circuit. The image data processing circuit may process image data for driving pixels of the display panel. In addition, the P-main communication circuit may transmit image data and first control data in an active section through a main communication line, and transmit second control data including a power saving control value in a blank section.

The data processing device may further include a P-auxiliary communication circuit for receiving an auxiliary communication signal through an auxiliary communication line. In addition, the P-main communication circuit transmits a value indicating the power saving operation of the data driving device through the power saving control value, and the P-auxiliary communication circuit confirms that the data driving device has entered the power saving mode through the auxiliary communication signal.

When it is confirmed that the data driving device has entered the power saving mode, the P-main communication circuit may operate in the power saving mode for a predetermined time.

The P-main communication circuit may transmit a clock training signal after a predetermined time elapses, and may transmit image data when it is confirmed that the data driving device is clock trained through the P-auxiliary communication circuit.

The P-main communication circuit may transmit a clock training signal to the data driving device when it is confirmed that the data driving device has entered the power saving mode through the P-auxiliary communication circuit, after transmitting a value indicating normal operation of the data driving device through the power saving control value.

The power saving control value may include a first power saving control value for controlling a power saving operation of the data driving device and a second power saving control value for controlling a procedure for switching from the power saving mode to the normal mode. The P-main communication circuit may transmit the clock training signal to the data driving device after a predetermined time has elapsed after setting the second power saving control value to a first value.

The P-main communication circuit may transmit setting data at a first data rate lower than a second data rate for transmitting image data after a predetermined time has elapsed after setting the second power saving control value to the first value.

As described above, according to the present embodiments, data validity in data communication is checked in different ways according to the type and operation mode of transmission and reception data, thereby increasing accuracy and efficiency of data validation. According to the present embodiments, the amount of power consumed in data communication can be reduced, and the possibility of malfunction of erroneously entering the power saving mode due to a communication error can be minimized. Further, according to the present embodiments, even if an error occurs in one of the plurality of data driving devices, the entire data driving devices can be simultaneously initialized, and the operation modes of the data driving device and the data processing device can be simply synchronized. In addition, according to the present embodiments, management of the operation modes of the data driving device and the data processing device can be facilitated, and recovery time for an error can be minimized.

What is claimed is:

1. A data receiving device comprising:

a first circuit configured to receive setting data at a first data rate through a first communication line; and a second circuit configured to operate according to setting values included in the setting data and receive image data at a second data rate different from the first data rate through the first communication line.

2. The data receiving device of claim 1, further comprising:

a third circuit configured to drive pixels of a display panel according to the image data.

3. The data receiving device of claim 1, wherein:

the second circuit includes a clock recovery circuit, the clock recovery circuit is configured to restore a first communication clock from an embedded clock signal received at the second data rate, the second circuit is configured to extract the image data from the embedded clock signal according to the first communication clock, and the setting data includes a setting value of the clock recovery circuit.

4. The data receiving device of claim 3, wherein the second circuit includes a deserializer, and wherein the deserializer is configured to parallelize the image data extracted from the embedded clock signal in a byte unit or a symbol unit.

5. The data receiving device of claim 4, wherein the second circuit includes a decoder, and wherein the decoder is configured to decode the image data, encoded by using a DC balance code or a limited run length code (LRLC), based on a decoding table stored in a memory.

6. The data receiving device of claim 5, wherein the second communication circuit includes a descrambler, and wherein the descrambler is configured to restore the image data, scrambled according to a prescribed protocol, to data in an original state.

7. The data receiving device of claim 5, wherein the second circuit includes an unpacker, and wherein the unpacker is configured to align the image data in pixel unit and transmit the aligned image data to the data receiving circuit.

8. The data receiving device of claim 1, wherein the first circuit includes a deserializer, and wherein the deserializer is configured to parallelize a communication signal received in a serial form through the first communication line and decode the communication signal by using a Manchester code.

9. The data receiving device of claim 8, wherein the communication signal comprises a plurality of parts, and wherein a first part includes a second communication clock, a second part includes a start signal, a third part includes a message header, a fourth part includes the setting data, a fifth part includes an error check value, and a sixth part includes an end signal.

10. The data receiving device of claim 1, further comprising:

a fourth circuit configured to transmit a state signal for the first circuit through a second communication line.

11. The data receiving device of claim 10, further comprising:

a fifth circuit configured to transmit a performance evaluation feedback signal for a communication evaluation result obtained based on a recognition rate of a test pattern received through the first communication line.

12. The data receiving device of claim 11, further comprising:

a sixth circuit configured to combine the state signal with the performance evaluation feedback signal and transmit a combined signal to the second communication line.

13. A data transmitting device comprising:

a first circuit configured to transmit setting data, for communication at a first communication rate, at a second communication rate different from the first communication rate through a first communication line; and a second circuit configured to transmit the image data at the first communication rate through the first communication line after the setting data has been transmitted.

14. The data transmitting device of claim 13, further comprising:

a third circuit configured to process image data for driving pixels of a display panel.

15. The data transmitting device of claim 13, wherein, in the second circuit, each frame time is divided into a first section and a second section, the image data and first control data being transmitted in the first section and second control data being transmitted in the second section, and wherein the first control data includes a control value applied in a line unit or a pixel unit of the display panel and the second control data includes a control value applied in a period longer than the line unit or a control value applied in a frame unit.

16. The data transmitting device of claim 13, wherein the second circuit includes:

a packer configured to generate transmission data by packaging at least one of the image data, the first control data, and the second control data;

a scrambler configured to scramble some or all of the transmitted data;

an encoder configured to encode the transmission data by using a DC balance code or a limited run length code (LRLC); and a serializer configured to convert the transmission data in a serial form to form a transmission stream.

17. The data transmitting device of claim 16, wherein the serializer is configured to distribute the transmission data to each of two or more pairs to transmit the distributed transmission data.

18. A display panel driving device comprising:

a first communication line through which low voltage differential signaling (LVDS) communication is performed;

a data processing device configured to transmit setting data to the first communication line at a first communication rate; and a plurality of data driving devices configured to perform a communication at a second communication rate different from the first communication rate through the first communication line, set a second communication environment according to setting values included in the setting data, receive image data through the second communication, and drive pixels of a display panel.

19. The display panel driving device of claim 18, further comprising:

a second communication line through which a state signal is transmitted and received, wherein each of the data driving devices is configured to transmit the state signal to the data processing device through the second communication line when an abnormality is detected in the second communication.

20. The display panel driving device of claim 19, wherein:

the first communication line is configured to connect the data processing device and each of the data driving devices in a one-to-one way, and the second communication line is configured to connect the data processing device and the data driving devices in a cascade form.

* * * * *